(12) United States Patent
Ablabutyan et al.

(10) Patent No.: US 7,762,756 B1
(45) Date of Patent: Jul. 27, 2010

(54) LIFT AND MOVEABLE UNDERRIDE

(75) Inventors: Karapet Ablabutyan, Glendale, CA (US); Akop Gasparian, Panorama City, CA (US)

(73) Assignee: Maxon Industries, Inc., Santa Fe Springs, CA (US)

( * ) Notice: Subject to any disclaimer, the term of this patent is extended or adjusted under 35 U.S.C. 154(b) by 50 days.

(21) Appl. No.: 12/004,372

(22) Filed: Dec. 20, 2007

Related U.S. Application Data

(60) Provisional application No. 60/871,299, filed on Dec. 21, 2006.

(51) Int. Cl.
*B60P 1/44* (2006.01)

(52) U.S. Cl. ............... 414/556; 414/546; 414/558; 414/401

(58) Field of Classification Search .......... 414/546, 414/556, 557, 558, 401
See application file for complete search history.

(56) References Cited

U.S. PATENT DOCUMENTS

| | | | | |
|---|---|---|---|---|
| 3,528,574 | A | * | 9/1970 | Denner et al. ............... 414/558 |
| 3,638,811 | A | * | 2/1972 | Robinson .................... 414/558 |
| 6,179,311 | B1 | * | 1/2001 | Larkin et al. ................ 280/154 |
| 6,431,819 | B1 | * | 8/2002 | Hahn .......................... 414/809 |

OTHER PUBLICATIONS

Maxon Lift Corporation, Instruction, GPT/80-Series Underride Installation Kits, pp. 1-8, DSG# M-02-04 Rev. A, Jul. 23, 2002.

Maxon Maintenance Manual GPT-25 & GPT-33, M-04-04, Jul. 2004, pp. 1-41.

Maxon Installation Manual GPT-25 & GPT-33, M-04-06, Jul. 2004. pp. 1-40.

Reference A.: Morgan Corporation, is apparently a picture of a stowaway lift, dated approx. Aug. 2006-Jan. 2007.

Reference B.: Waltco Lift Truck Company, is apparently a picture of a lift gate dock lock device, May 25, 2006.

Reference C.: MBB/Interlift, is apparently a picture of an interlift gate, approx. Jan. 2007.

§ 571.224 Standard No. 224; Rear Impact Proctection, published in the National Highway Traffic Safety Admin., DOT, 49 CFR Ch. V (Oct. 1, 2006 Edition), pp. 810-812.

§ 571.223 Standard No. 223; Rear Impact Guards, published in the National Highway Traffic Safety Admin., DOT, 49 CFR Ch. V (Oct. 1, 2006 Edition), pp. 851-855.

* cited by examiner

*Primary Examiner*—Saúl J Rodríguez
*Assistant Examiner*—Jonathan D Snelting
(74) *Attorney, Agent, or Firm*—Michael Zarrabian, Esq.; Myers Andras Sherman LLP

(57) ABSTRACT

The invention provides a moveable underride system that may be used with lifts such as stow lifts. The underride system includes an underride member and a linkage mechanism for coupling the underride member to a support frame, wherein the linkage mechanism moves the underride member between an extended position and a retracted position. In the extended position the underride member is at a first distance from the frame, and in the retracted position the underride is at a second distance from the frame, such that the first distance (for the extended position) is larger than the second distance (for the retracted position).

10 Claims, 22 Drawing Sheets

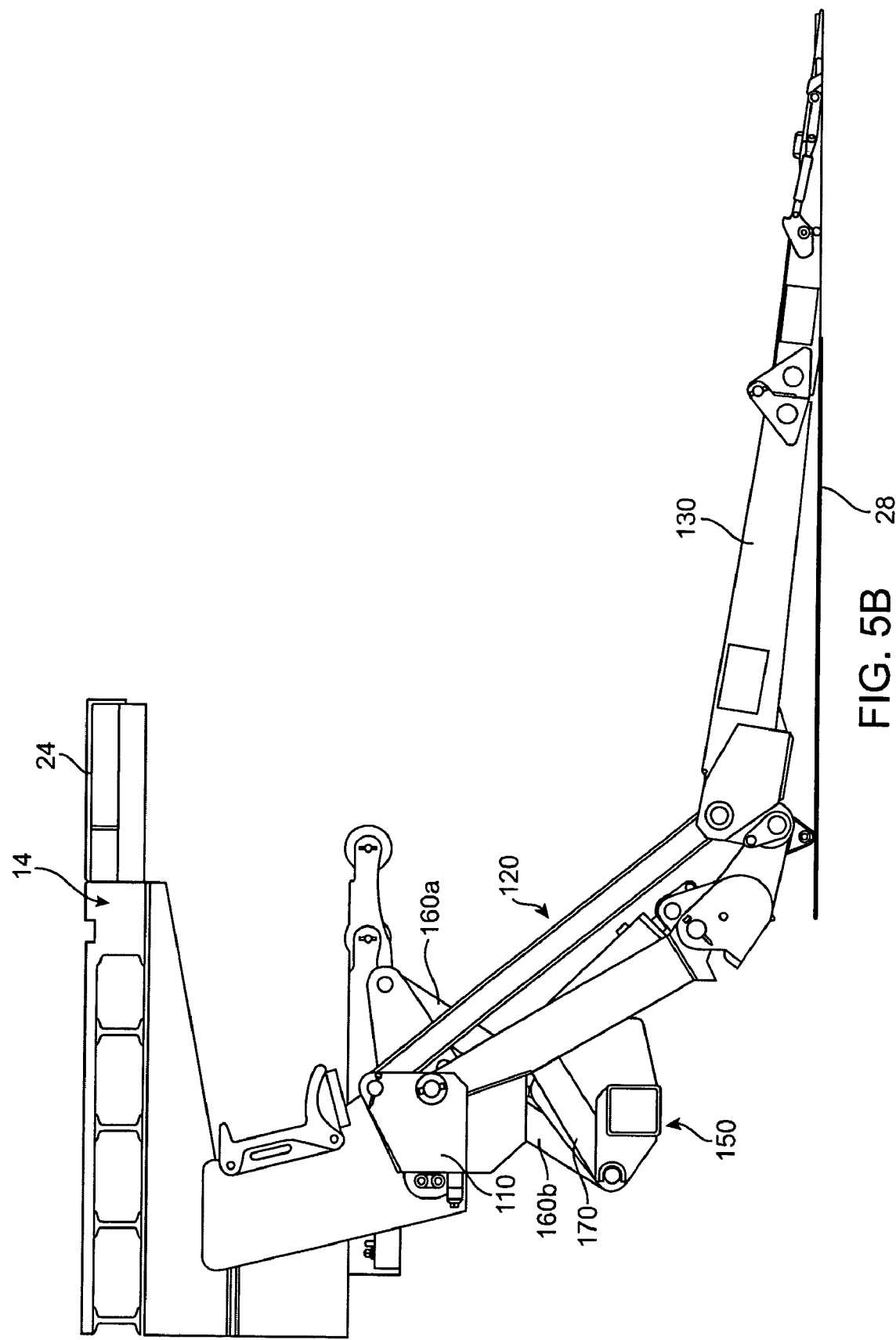

LIFT AND MOVEABLE UNDERRIDE

CROSS-REFERENCE TO RELATED APPLICATIONS

The present application claims priority under 35 USC section 119(e) to U.S. Provisional Application No. 60/871,299, filed on Dec. 21, 2006, the disclosure of which is hereby incorporated by reference in its entirety.

BACKGROUND OF THE INVENTION

1. Field of the Invention

The present invention relates generally to vehicle rear impact guards, and in particular to rear impact guards used with lifts and dock locks.

2. Description of Related Art

Rear impact guards, or commonly known as underrides, are used to reduce the chance of following vehicles from driving underneath the bed of a vehicle such as a truck or a trailer. FIG. 1A shows a rear view of a vehicle 10, such as a conventional truck or trailer, with a fixed horizontal underride 12 (relative to ground level 28), installed below the vehicle bed 14 via vertical beams 17. As shown in the side view of the vehicle 10 in FIG. 1B, the underride 12 is positioned under the end of the vehicle close to or flush with a plane 11 of the rear end of the vehicle 10. The vertical height S1 between the underride 12 and the ground level 28 is at a predefined distance (e.g., no more than 22 inches) suitable to reduce the chance of following vehicles from traveling underneath the bed of a vehicle. The distance S2 from an edge of the underride 12 to the side end of the vehicle 10 is also at a predefined range (e.g., no more than 3.9 inches).

Such fixed underrides 12 are also often used with dock locks (truck locks) 102 to prevent the vehicle from being pushed away or "seesawing" while the vehicle is parked at a dock 40 or other loading facility (FIGS. 1B-1C). A dock lock 102 may include a bar, hook, and/or platform, which engages, holds, latches, and/or supports the underride. A typical dock lock 102 is designed to operate with such underrides 12, wherein the dock lock 102 is fixedly positioned by a plate 13 within a short grabbing distance N from the dock 40. During loading and unloading operations, the vehicle 10 is backed up to the dock 40 against slight bumpers 23, wherein the vehicle bed 14 is generally horizontally aligned with the upper surface of the dock (FIG. 1B). A dock lock 102 engages or grabs a center portion of the underride 12, thus locking the vehicle 10 in position relative to the dock 40 (FIGS. 1B-1C).

Further, lifts such as liftgates are typically mounted at a structure such as the rear of a vehicle to lift payloads on a platform from one level (e.g., ground level) up to another level (e.g., the bed of the vehicle), or vice versa. A common type of lift, known as a stow lift (tuck under lift), includes a platform that is tucked (stowed) under the vehicle bed when not in use, and can be untucked (unstowed) when needed. In this type of lift, the platform is typically foldable and is linked to an actuator which can raise and lower the platform, as well as stow and unstow the platform. The conventional underride 12 shown in FIG. 1 is fixed to the vehicle 10 so that the underride 12 cannot move. As a result, such an underride 12 is not compatible with a lift that is stowed under the rear end of the vehicle since the underride 12 interferes with the stowing and unstowing of the lift.

BRIEF SUMMARY OF THE INVENTION

The invention provides a moveable underride system that may be used with lifts such as stow lifts (tuck under lifts). In one embodiment the invention provides an underride system including an underride member and a linkage mechanism for coupling the underride member to a support frame, wherein the linkage mechanism moves the underride member between an extended position and a retracted position. In the extended position the underride member is at a first distance from the frame, and in the retracted position the underride is at a second distance from the frame, such that the first distance (for the extended position) is larger than the second distance (for the retracted position). When, the underride system is coupled to a rear frame of a vehicle such as a truck or a trailer, the extended position of the underride member allows at least a portion of the underride member to be engaged by a dock lock of a docking station.

In another embodiment the invention provides a lift system configured for use with a vehicle, the lift system comprising a stow lift and an underride system. The stow lift includes a support platform coupled to a frame via a lift linkage, the platform capable of being moved by an actuator via the lift linkage between a stowed position and an unstowed position. The underride system includes a generally elongate underride member and a linkage mechanism for coupling the underride member to the frame for moving the underride between an extended position and a retracted position. In the extended position the underride member is at a first distance from the frame, and in the retracted position the underride is at a second distance from the frame, such that the first distance (for the extended position) is larger than the second distance (for the retracted position). The extended position of the underride member corresponds to the stowed position of the lift platform, and the retracted position of the underride member corresponds to the unstowed position of the lift platform, such that in the retracted position, the underride member allows the platform to be moved to the unstowed position. Further, in the extended position, the underride member is disposed relative to the lift such that at least a portion of the underride can be engaged by a dock lock at a docking station.

These and other features, aspects and advantages of the present invention will become understood with reference to the following description, appended claims and accompanying figures.

BRIEF DESCRIPTION OF THE DRAWINGS

FIG. 5B shows a side view of the unstowed lift with the underride at an adjusted position and the lift platform extended, according to an embodiment of the invention.

DETAILED DESCRIPTION OF THE INVENTION

The invention provides a moveable underride system that may be used with lifts such as stow lifts (tuck under lifts). In one embodiment the invention provides an underride member and a linkage mechanism for coupling the underride member to a frame, wherein the linkage mechanism moves the underride member between an extended position and a retracted position. In the extended position the underride member is at a first distance from the frame, and in the retracted position the underride is at a second distance from the frame, such that the first distance (for the extended position) is larger than the second distance (for the retracted position). When the underride system is coupled to a rear frame of a vehicle such as a truck or a trailer, the extended position of the underride member allows at least a portion of the underride member to be engaged by a dock lock of a docking station.

In another embodiment the invention provides a lift system configured for use with a vehicle, the lift system comprising a stow (tuck under) lift and an underside system. The stow lift includes a platform coupled to a frame via a lift linkage, the platform capable of being moved by an actuator via the lift linkage between a stowed position and an unstowed position. The underride system includes a generally elongate underride member and a linkage mechanism for coupling the underride member to the frame for moving the underride between an extended position and a retracted position. In the extended position the underride member is at a first distance from the frame, and in the retracted position the underride is at a second distance from the frame, such that the first distance (for the extended position) is larger than the second distance (for the retracted position). The extended position of the underride member corresponds to the stowed position of the lift platform, and the retracted position of the underride member corresponds to the unstowed position of the lift platform, such that in the retracted position, the underride member allows the platform to be moved to the unstowed position. Further, in the extended position, the underride member is disposed relative to the lift that at least a portion of the underride can be engaged by a dock lock at a docking station.

Figure 2A:
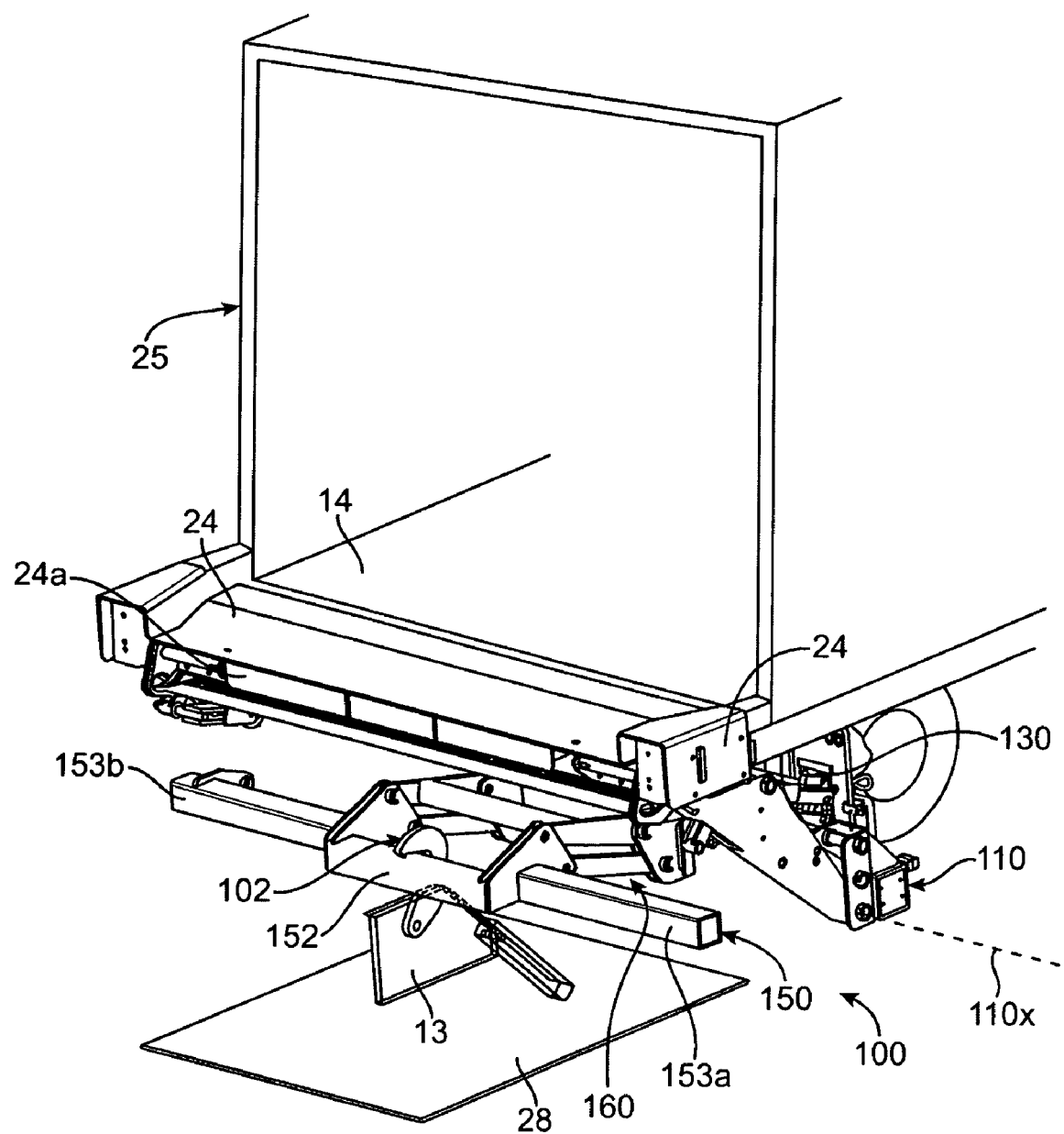
FIG. 2A shows a perspective view of a lift system including a lift and a moveable underride locked to a dock lock, according to an embodiment of the invention.

Referring to FIGS. 2A-2F, a lift system 100 according to an embodiment of the invention includes a stow lift having a lift platform 130 coupled to a support frame 110 via a lift linkage 120. The lift system 100 further includes an underride system comprising a moveable underride member 150 coupled to a frame 110 via at least a linkage mechanism 160. In this example, the lift system 100 is attached to a vehicle 25 having a vehicle bed 14 and optionally an extension plate 24 of the vehicle bed 14. In FIG. 2A, the underride 150 is shown in its extended (raised) position locked to a typical dock lock 102 of a docking station (not shown). The lift platform 130 is in its stowed position, and the underride 150 is grabbed (locked) by the dock lock 102 extending upwardly from the ground level 28.

The underride 150 is a generally elongate member which in one example shown in FIG. 2A, comprises a middle portion 152 and side portions 153a, 153b. The middle portion 152 forms a central extrusion portion that is offset relative to the first and second portions 153, 153b. The underride 150 can be positioned relative to the lift system 100 such that when the underride 150 is fully extended (FIG. 2A), the portion 152 is substantially flush with the rear plane 24a of the bed 14 (or extension plate 24).

Figure 1A:
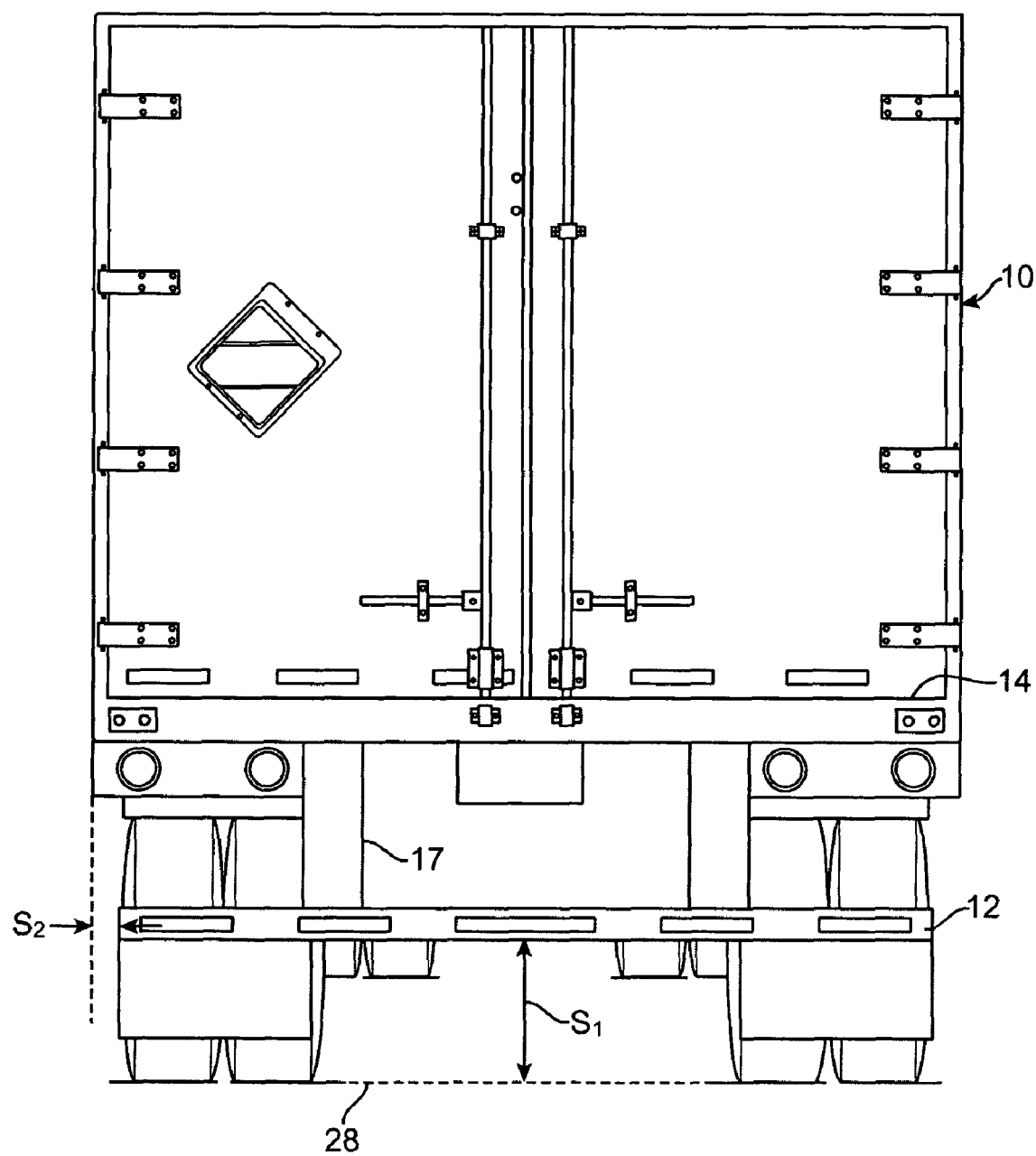
FIG. 1A shows a vehicle with a conventional fixed underride.

Preferably, the underride 150 is positioned relative to the lift system 100 such that when the underride 150 is fully extended (e.g., FIGS. 2A-2C, 3A-3B), the portion 152 is compatible with existing dock locks that have a grabbing distance N designed for fixed underrides 12 (FIGS. 1A-C) (i.e., the portion 152 within a grabbing distance N of a dock lock 102 for fixed underrides 12). The underride 150 is positioned on the lift system 100 to be used with dock locks 102 to prevent the vehicle from being pushed away or "seesawing" while the vehicle is parked at a dock or other loading facility.

Figure 2B:
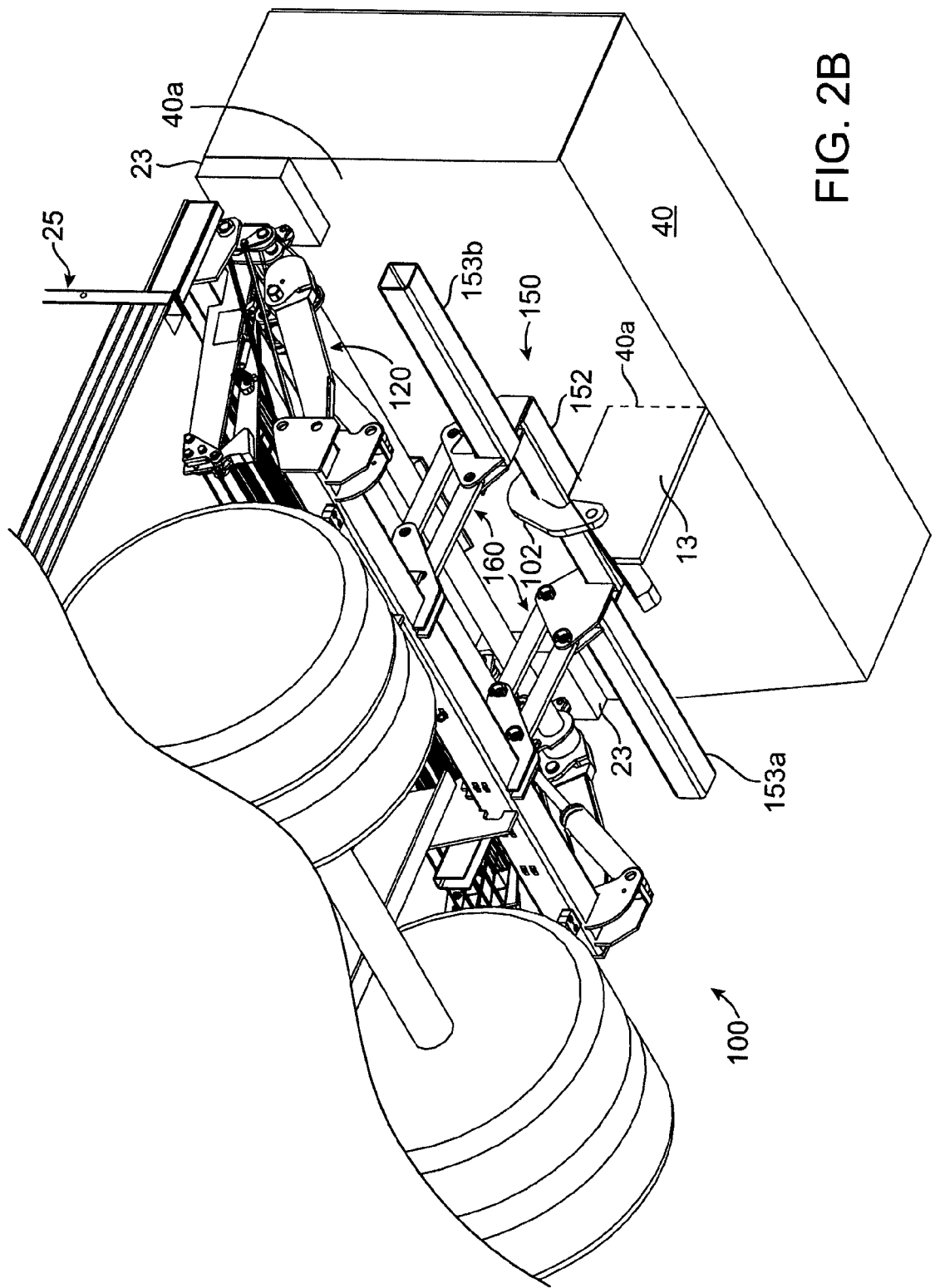
FIG. 2B shows a perspective underside view of the lift system in FIG. 2A locked to a dock lock.
Figure 2C:
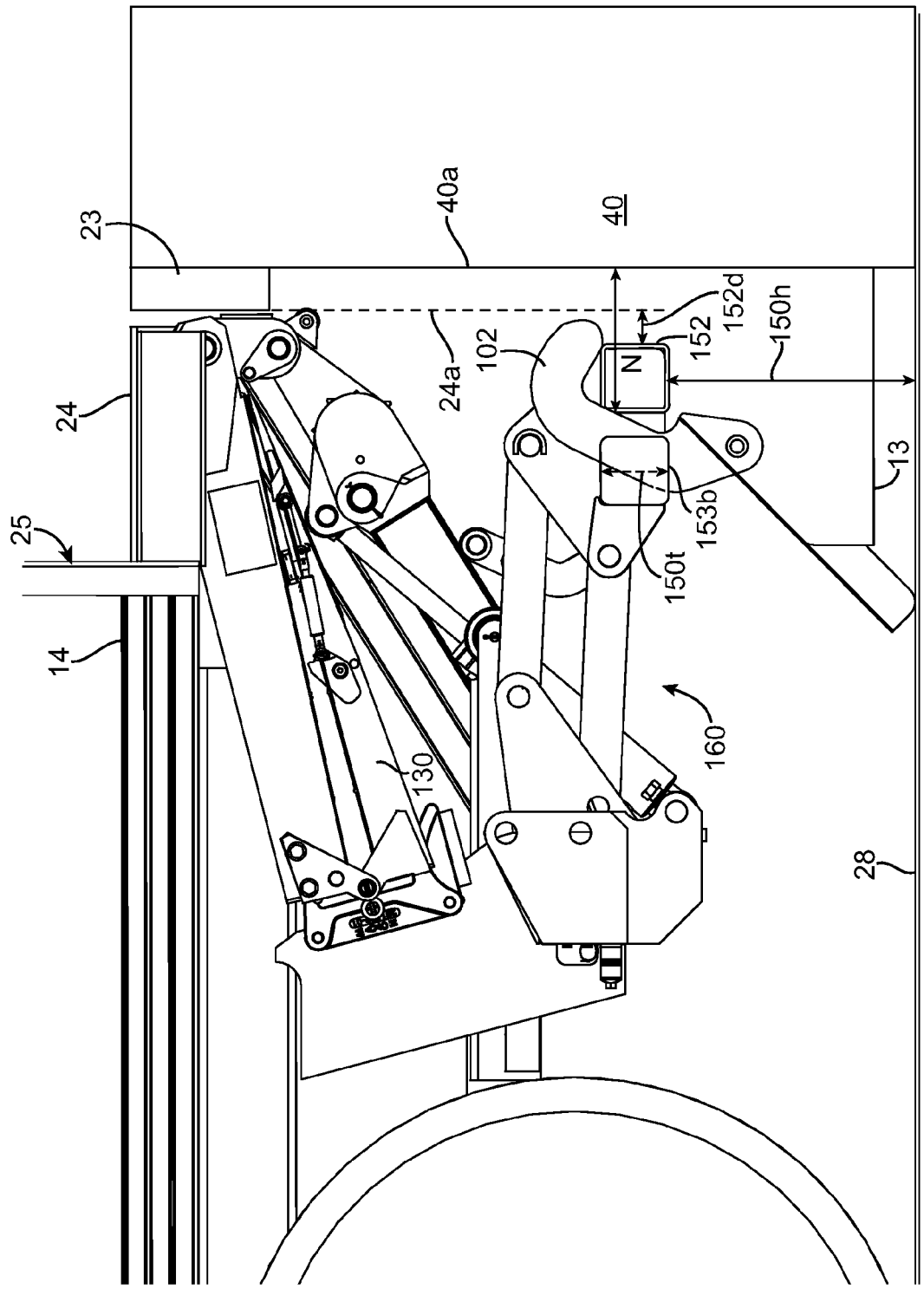
FIG. 2C shows a side view of the lift system in FIG. 2B locked to a dock lock.

As shown in FIGS. 2B-C, as the vehicle backs up against one or more slight bumpers 23 on an outer surface 40a of the docking station 40, the extrusion 152 advantageously comes close to, and may be essentially flush with, the surface 40a of the dock 40. The underride 150 is within the typical grabbing distance N of a dock lock 102 from the dock 40 (the dock lock 102 is at a distance N form the surface 40a). When the vehicle is backed up against the dock 40, the vehicle rear plane 24a is proximate, and parallel, to the outermost surface 40a of the docking station 40.

As shown in FIG. 2C, when the underride 150 is in its extended (fully raised) position and the lift platform 130 is stowed, the extrusion 152 of the underride 150 has a horizontal distance 152d from the rear end plane 24a of the vehicle.

In one example, the height 150*h* of the fully extended (raised) underride 150 above the ground 28 is less than 22 inches. The thickness 150*t* of the underride 150 is about 4 inches. Other dimensions for the underride 150 are possible. The docking station 40 as shown in FIG. 2B has a retention 13 and the dock lock 102 resides substantially in the retention 13.

Figure 2D:
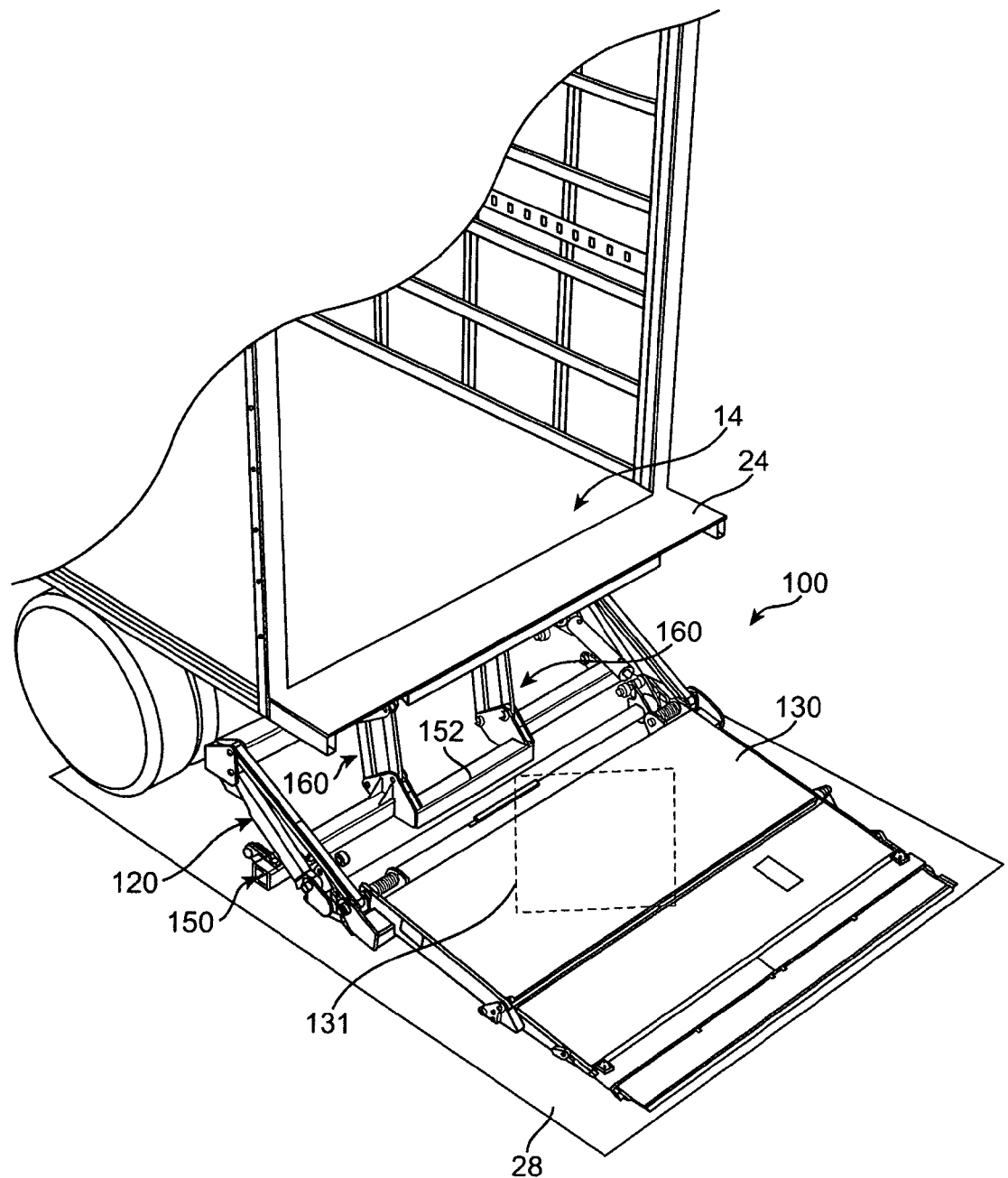
FIG. 2D shows a perspective view of the lift system in FIG. 2A with the lift platform extended at the ground level.

FIG. 2D shows a perspective view of the lift system 100 with the lift platform 130 extended at the ground level 28. The platform 130 is loaded with cargo 131. As shown, and as further described later in detail, preferably the underride 150 does not contact the ground level 28 even at its fully lowered (retracted) position. However, in other embodiments the underride 150 may be allowed to come in contact with the ground level 28 without interfering with fully unstowing of the platform 130.

Figure 2E:
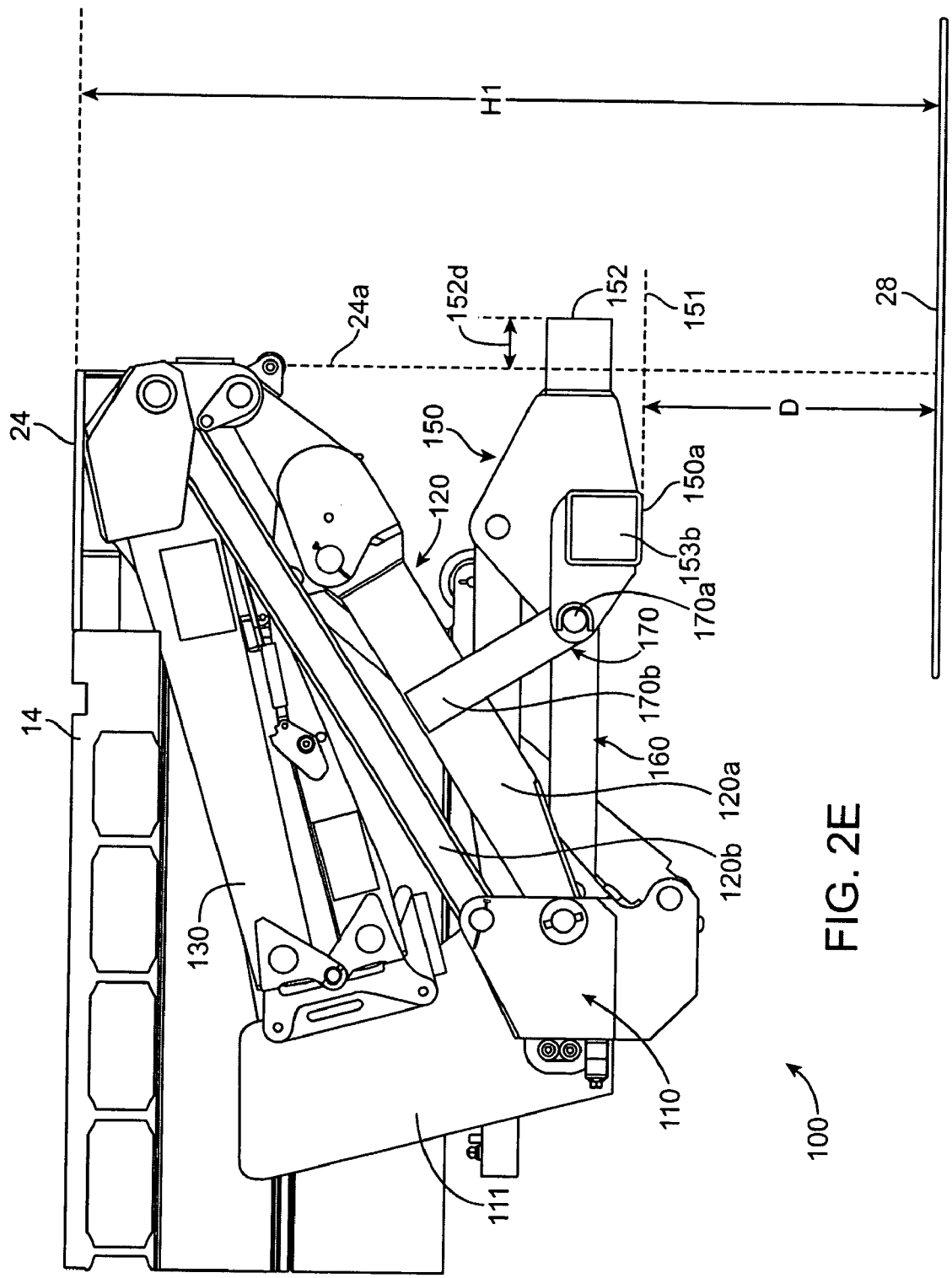
FIG. 2E shows a side view of another example of the lift in the stowed position and the underride fully raised, according to an embodiment of the invention.
Figure 2F:
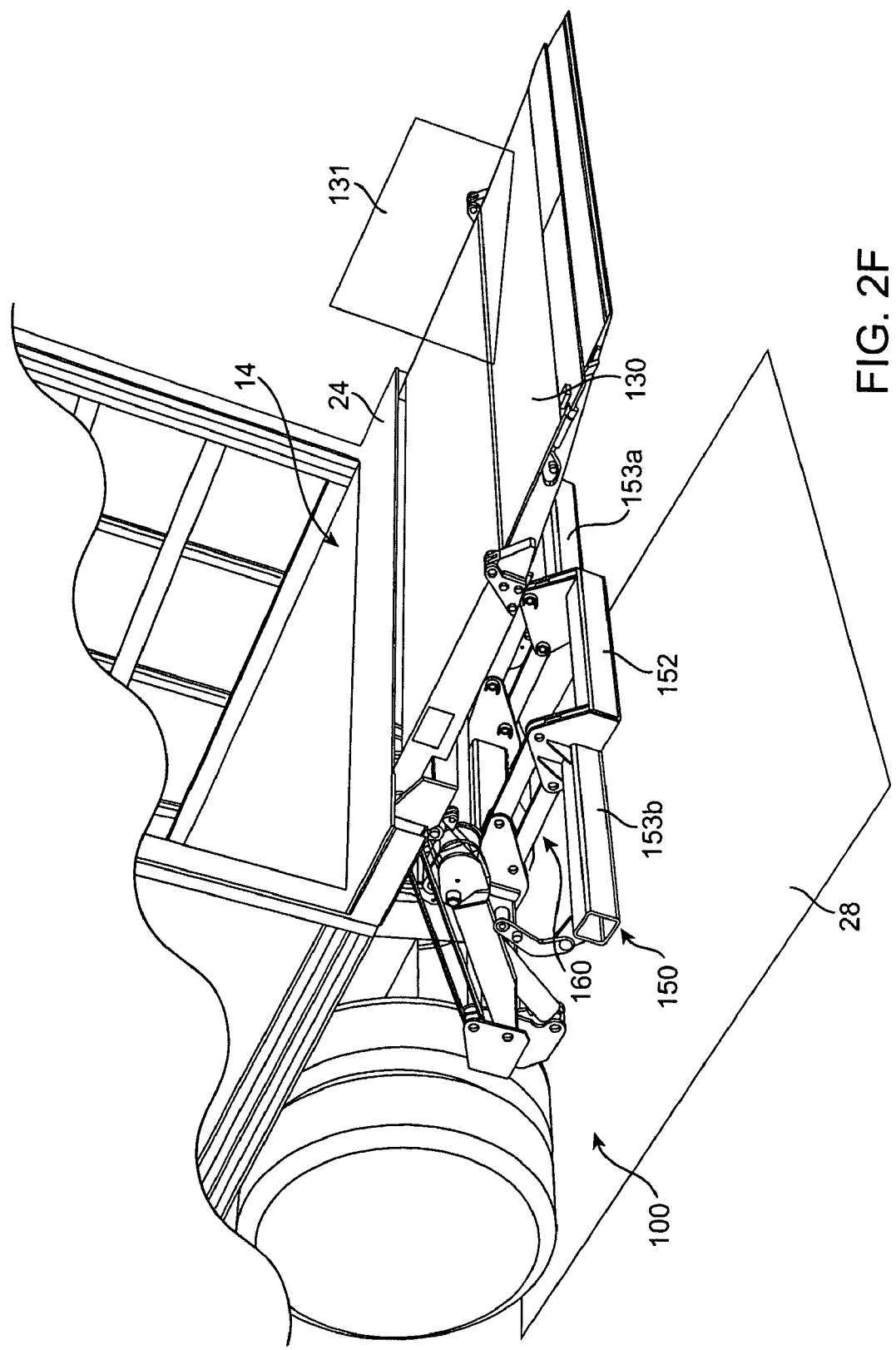
FIG. 2F a shows perspective view of the lift system with the lift platform extended and in a lifted position.

FIG. 2F shows a perspective view of the lift system 100 with the lift platform 130 extended/unfolded but in a lifted position to move cargo from the vehicle bed into the platform or vice versa. As further described below, during the motion of the lift platform 130, the underride 150 does not interfere with the motion of the lift platform 130 as a result of the configuration of the underride 150, according to the preferred embodiment of the invention.

The distance 152*d* in accordance with one embodiment of the invention is less than 8 inches, preferably less than 4 inches and most preferably essentially flush with the plane 24*a*. As shown in FIG. 2E, it is also possible for the extrusion portion 152 to extend beyond the rear end plane 24*a* when the underride 150 is in a fully raised (fully extended) position, wherein the distance 152*d* is measured accordingly. This can be accomplished, for example, by offsetting the extrusion portion 152 further out from the side portions 153*a*, 153*b* of the underride (e.g., increasing distance 152L in FIG. 6A), or by increasing lengths of linkage arms 160*a*, 160*b*. In this embodiment, the underride 150 remains clear of the proper operation of the lift stowing/unstowing while remaining within the grabbing distance N of a dock lock 102 and does not interfere with docking, according to the invention.

Figure 3A:
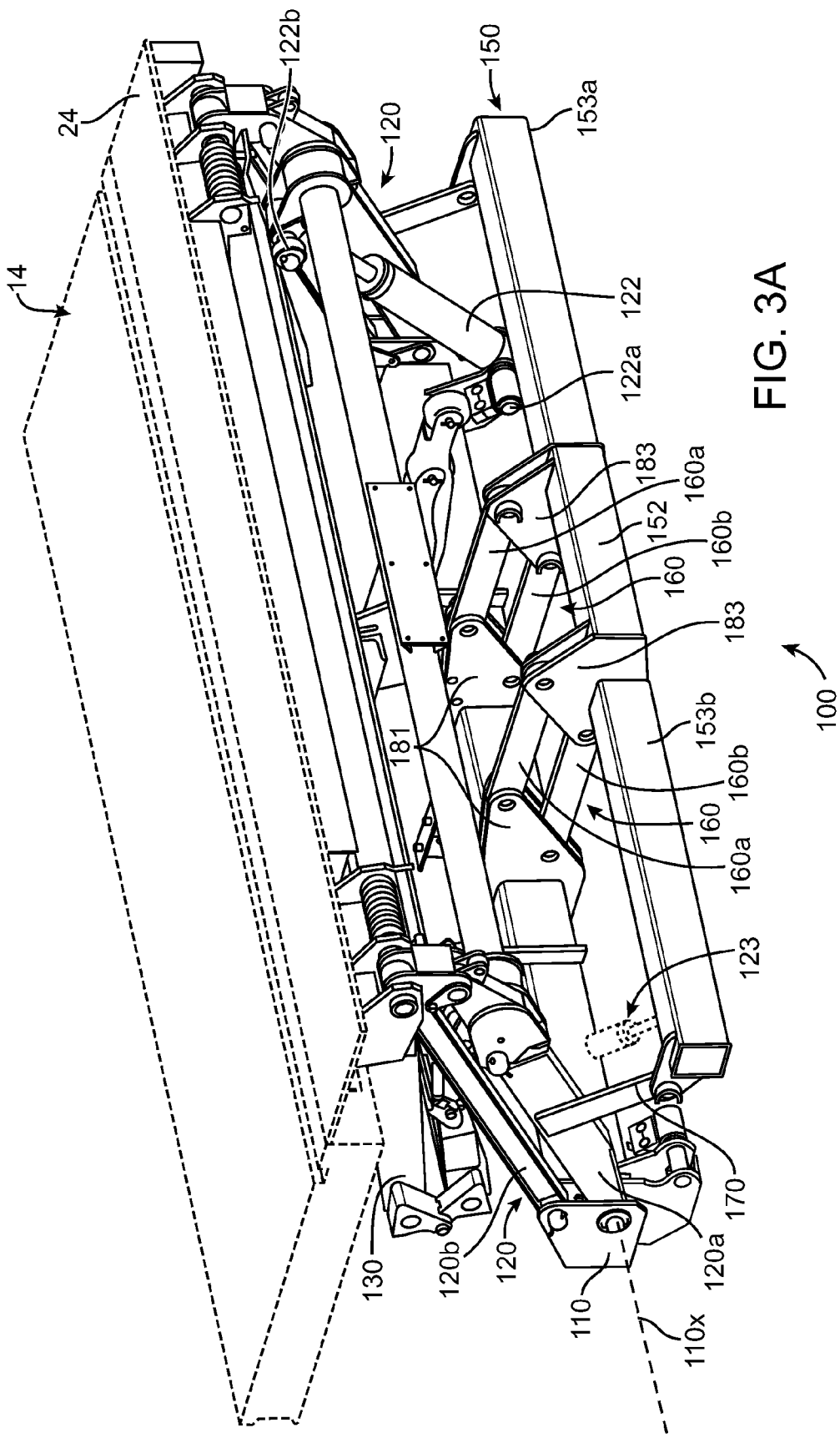
FIG. 3A shows a perspective view of the lift system with the platform in the fully stowed position and the underride fully raised, according to an embodiment of the invention.
Figure 3B:
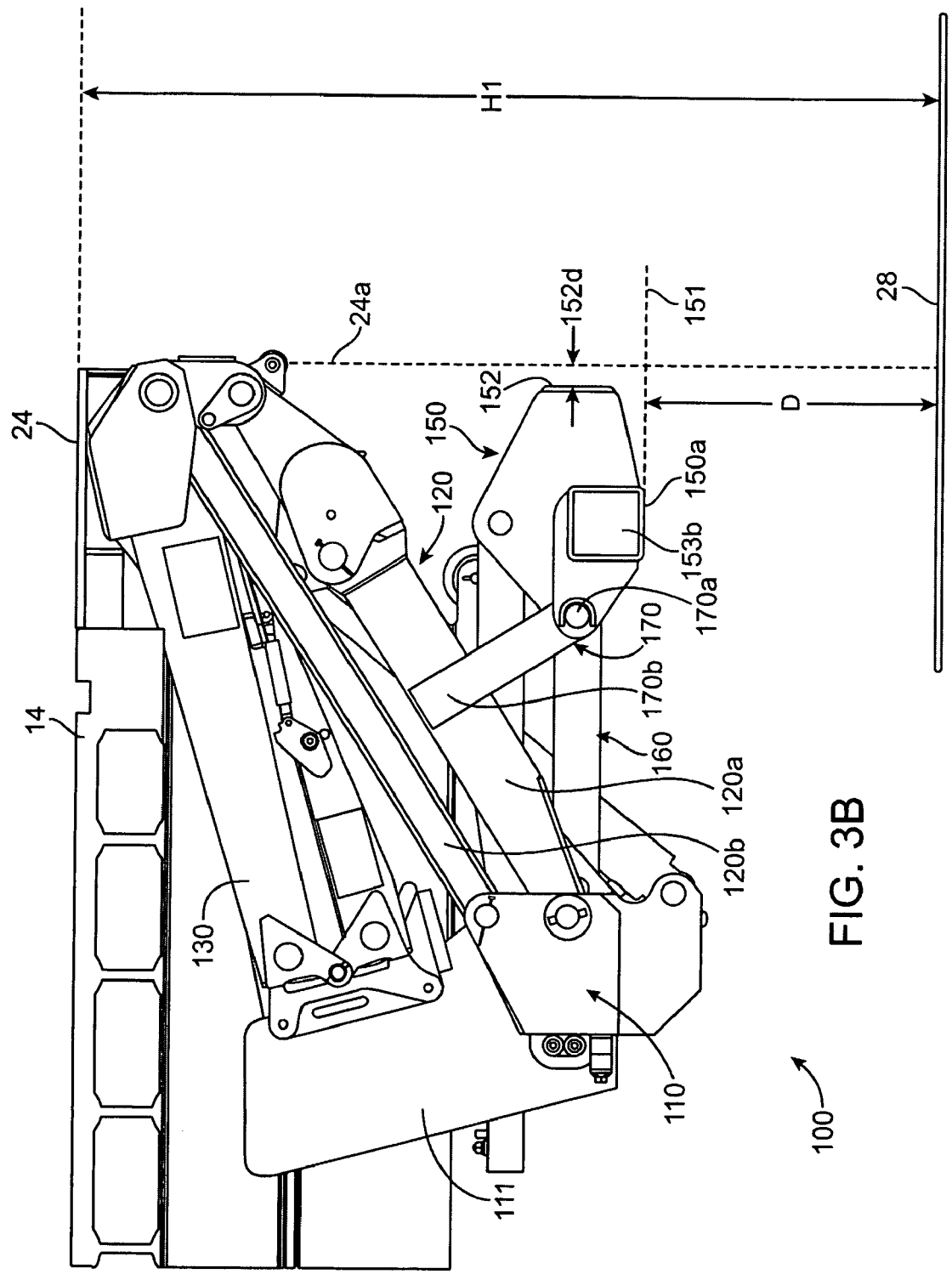
FIG. 3B shows a side view of the lift in the stowed position and the underride fully raised, according to an embodiment of the invention.
Figure 4A:
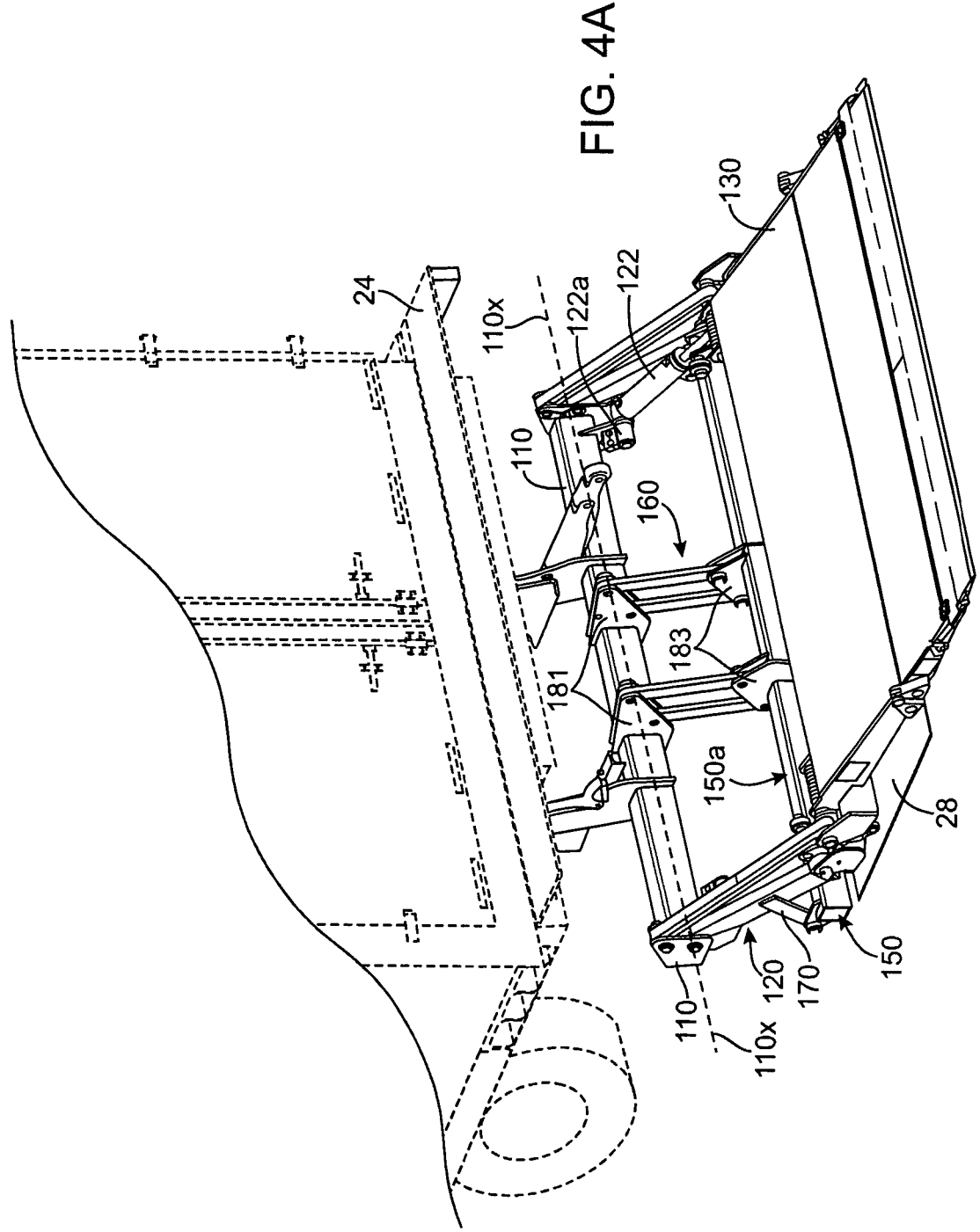
FIG. 4A shows an isometric view of the lift in the fully unstowed position, according to an embodiment of the invention.
Figure 4B:
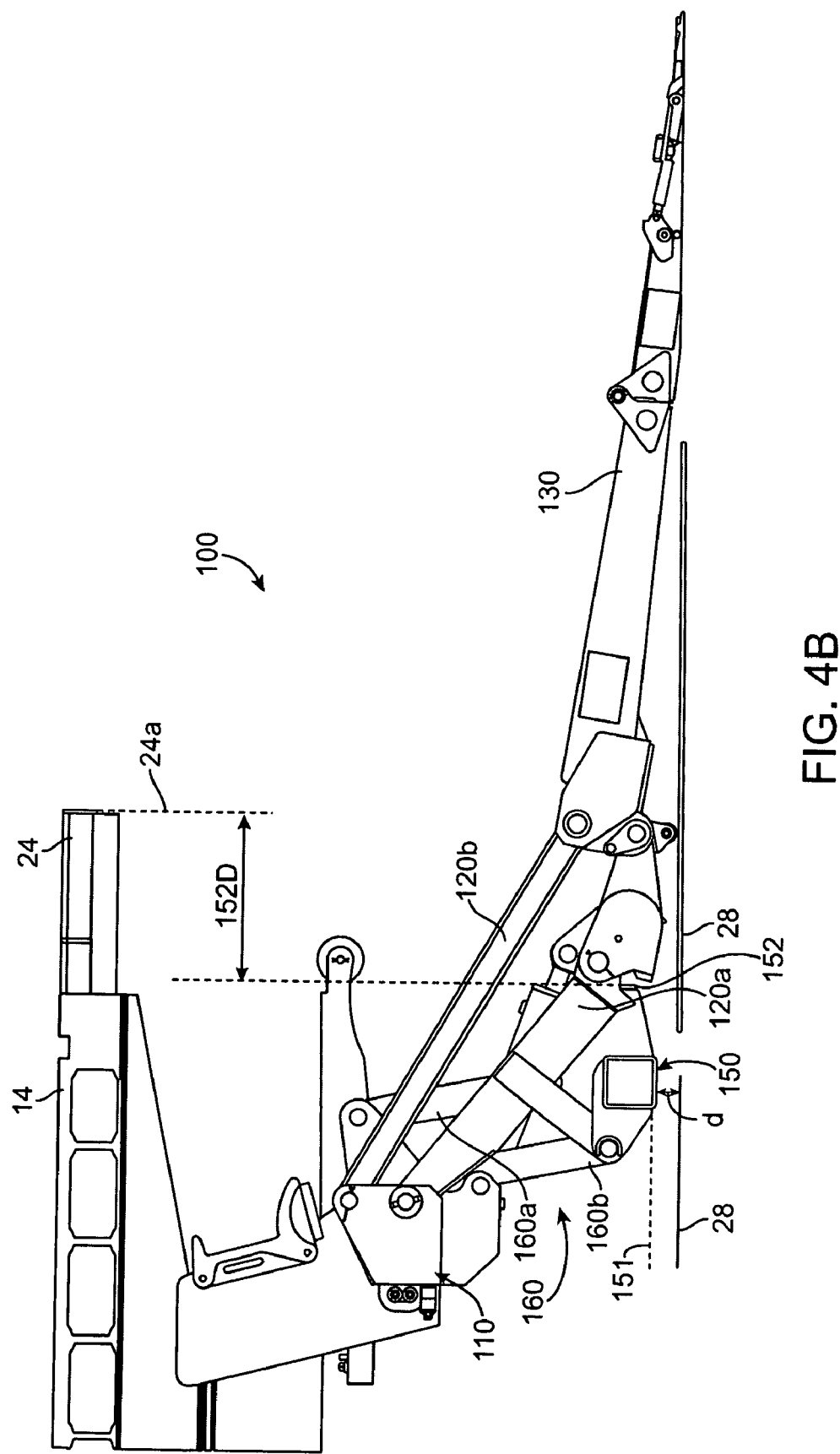
FIG. 4B shows a side view of the lift in the fully unstowed position and the lift platform extended, according to an embodiment of the invention.

FIGS. 3A-3B show an embodiment of the lift system 100, wherein FIG. 3A shows an isometric view of the lift system 100 and FIG. 3B shows a side view of the lift system 100, fully stowed and the underside 150 fully extended (raised). Further, FIGS. 4A-B show the lift system 100 fully unstowed. The lift system 100 includes the underride 150 and a lift that comprises an elongate frame 110 coupled to the lift platform 130 using platform-carrying linkage mechanisms 120, at each end of the frame 110. Each linkage mechanism 120 includes parallelogram linkages 120*a*, 120*b*, and may be coupled to the frame 110 at positions other than the end of the frame 110. The elongate frame 110 allows the lift system 100 to be fixedly installed via a bracket 111 (FIG. 3B) to the vehicle, proximate the vehicle bed 14.

An actuator 122 (such as a hydraulic actuator) is coupled between the frame 110 and the lift platform 130. Specifically, the actuator 122 is coupled to the frame 110 via a rotatable joint 122*a*, and the actuator 122 is coupled to the lift platform linkage 120 via a rotatable joint 122*b*. The actuator 122 moves the lift platform 130 from a stowed position (FIG. 3A) to an unstowed position (FIG. 4A), and vice versa. The frame 110 remains fixed in relation to the vehicle bed 14, and each linkage mechanism 120 at each end of the frame 110 allows the platform 130 to be raised/lowered by the actuator 122, while the platform 130 revolves about the long axis 110*x* through the frame 110 via the linkage mechanisms 120. As shown, the linkages 120*a*, 120*b* are elements of a parallelogram such that when the platform 130 is being raised or lowered, the platform 130 keeps substantially parallel to the ground level 28 by the action of the linkage mechanisms 120. The underride 150 revolves about the long axis of the frame 110 via the linkage mechanisms 160, while the platform 130 also revolves about the long axis of the frame 110 via the platform linkage mechanisms 120, both under the action of the actuator 122.

The platform 130 is foldable, and is rotatably coupled to the platform linkages 120 for stowing. An extension plate 24 may be coupled to, and substantially level with, the vehicle bed 14 as shown by example in FIG. 3B. The vehicle bed 14 is at a height H1 from the ground level 28.

The underride 150 is rotatably coupled by one or more underride linkage mechanisms 160 to the frame 110. Each underride linkage mechanism 160 allows raising (extending) and lowering (retracting) the underride 150 to prevent interference with the motion of the platform 130 when the platform 130 is being stowed, unstowed, raised, or lowered by the actuator 122. In one example, the actuator 122 may also be used to raise or lower the underride 150 via the linkage mechanisms 160, at the same time as raising or lowering the platform 130. The underride linkage mechanisms 160 may be a parallelogram linkage as shown, or any other suitable linkage. The linkage mechanisms 160 is configured such that when the underride 150 is fully raised, the underride 150 is within the typical grabbing distance N of a dock lock 102 from a dock 40.

The underride 150 itself and/or the underride linkage mechanisms 160 may be coupled to the platform linkage mechanisms 120, so that when the platform linkage mechanisms 120 raises or lowers the platform 130 through the action of one or more actuators 122, the underride 150 is also raised or lowered by revolving around the frame 110 via the linkage mechanisms 160. As such, the underride 150 essentially co-revolves with the platform 130 about the long axis 110*x* of the frame 110 by the action of the actuator 122. In one example, the underride 150 and/or linkage mechanisms 160 may be coupled to the platform linkage mechanisms 120 with a bracket 170 (FIG. 38). The bracket 170 may be fixed, or adjustable, so that the distance of the underride 150 relative to the ground 28 can be changed to accommodate different vehicle bed heights. In an alternative embodiment, the underride 150 and/or underride linkage mechanisms 160 may be moved by an optional independent underride actuator 123 (FIG. 3A). The underride 150 may then be raised and lowered independently of the platform 130, wherein the bracket 170 is unnecessary. Alternatively, the underride 150 may be slidably or telescopically coupled underneath the vehicle bed 14, and the underride 150 may be extended and retracted by an actuator or other device independent of the platform 130.

As noted, using the linkage mechanisms 160, the underride 150 can be raised (extended) so that it can be within grabbing distance N of a dock lock 102 and a suitable distance from the ground 28 and the rear plane 24*a* (e.g., FIGS. 2C, 5A), and the underride 150 can be lowered, to moved out of the way, when the platform 130 is being unstowed (FIGS. 4A-4B). Using the linkage mechanisms 160, the underride 150 can be positioned closer to the rear edge 24*a* of the vehicle bed, allowing the underride 150 to be used conveniently with existing dock locks that are typically located at a close distance N to docks. FIG. 3B illustrates a plane 151 as defined by a lower surface 150*a* of the underride 150. The plane 151 has a clearance D from the ground level 28 when the lift system 100 is in its stowed position and the underride 150 is in its extended position. The linkage mechanisms 160 allow the underride 150 to be moved and selectively positioned relative to the vehicle, the ground and a dock lock, according to the present invention. For example, the underride clearance D from the ground, and the underride distance 152*d* from the rear plane 24*a*, are preferably selected to reduce the chance of following vehicles from driving under the vehicle bed (the distances D and 152*d* may be dictated by local traffic laws). The distance 152*d* is also selected such that when the vehicle with the underride 150 extended/raised is backed up against a dock 40, the underride 150 is within grabbing distance N of the dock lock 102. Preferably, the clearance D in FIG. 3B is essentially the same as distance 150*h* in FIG. 2C.

In one example, in the fully lowered (unstowed) position (FIGS. 4A-4B) the platform 130 is brought near, or to, the ground 28 (FIG. 4B), for loading and unloading cargo thereon. The underride 150 is also fully lowered to its retracted position, but preferably the underride 150 does not contact the ground 28. When the underride 150 is fully lowered, the plane 151 of the underside of the underride 150 has a clearance distance of d from the ground 28, wherein d can be a few inches. In another example, the underride 150 is also fully lowered to its retracted position, such that the underride lower surface 150*a* may be flush to the ground 28 (i.e., d is at or about 0). By comparing FIGS. 3B and 4B, it is shown that from the extended position of the underride 150 (FIG. 3B) to the retracted position (FIG. 4B), the ground clearance decreases from D to about d, wherein in the preferred embodiments D is less than about 22", and d is 0 or more inches. Horizontally the underride 150 also moves from its extended position (FIG. 3B) at a distance 152*d* to a distance 152D at the retracted position (FIG. 4B), as measured from the extrusion portion 152 to the rear end plane 24*a*. For example, the distance 152D for the retracted underride can be larger than 10 inches. Other examples are possible.

Figure 5A:
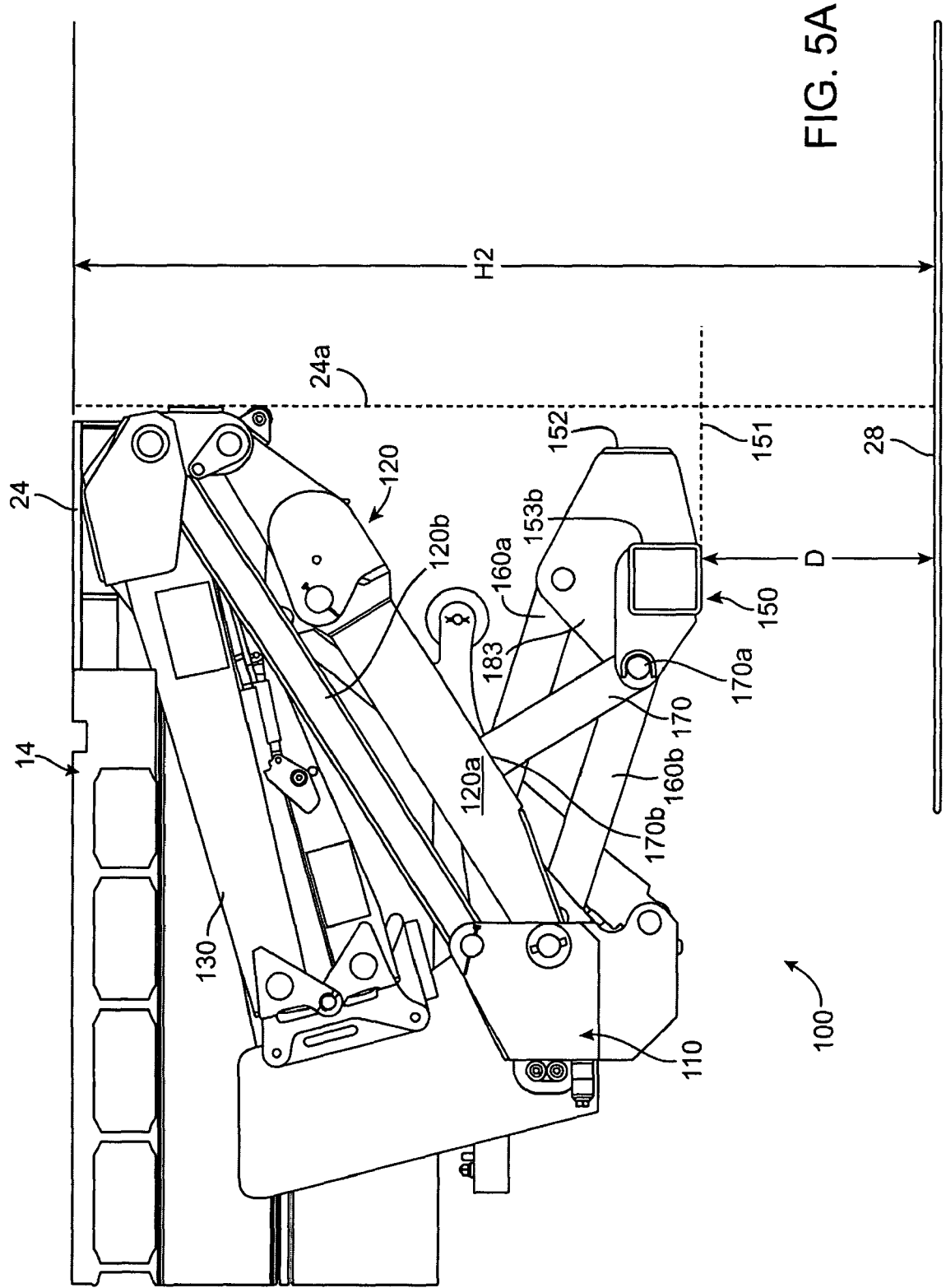
FIG. 5A shows a side view of the lift in the fully stowed position with the underride raised relative to the vehicle bed, according to an embodiment of the invention.

FIGS. 5A-5B show side views of the lift system 100 in example stowed and unstowed (ground) positions, respectively, with the underride 150 at an adjusted distance from the vehicle bed 14. As shown in FIG. 5A, the position of the platform linkage mechanism 120 on the bracket 170 has been adjusted such that, even though the vehicle bed 14 is at a height H2 from the ground 28, higher than the height H1 shown in FIG. 3B, the extended (raised) underride 150 in FIG. 5A is at about the same height D from the ground 28 as the extended (raised) underride 150 in FIG. 3B. This allows maintaining the height D of the underride 150 from the ground 28 at a desirable level to be compatible with different height trucks, vehicle beds, and heights standard dock locks 102 from ground, regardless of vehicle size or distance of the vehicle bed 14 to the ground. As can be seen in FIG. 5B, in this embodiment the underride 150 does not contact the ground when the lift 100 is in a ground/unstowed position.

The bracket 170 may be adjustable such that the distance D of the underride 150 to the ground 28 (when the lift system 100 is stowed and the underride 150 is raised), can be changed or maintained for different vehicle bed heights. As such the difference (H2−D) is adjusted. As shown in FIG. 3B, the bracket 170 has two ends 170*a*, 170*b*. The first bracket end 170*a* is attached to the underride 150, while the second bracket end 170*b* is attached to a linkage mechanism 120. Specifically, in FIG. 3B, the bracket end 170*b* is attached to an upper part of the width of an elongate arm linkage 120*a* of the platform linkage mechanism 120, while in FIG. 5A the bracket end 170*b* is attached to a lower part of the width of another elongate arm linkage 120*a* of the linkage mechanism 120. As such, in FIG. 3B the underride 150 is closer to the vehicle bed 14 as compared with the underride 150 in FIG. 5A. In both FIGS. 4B and 5A the underride 150 is at essentially the same height/distance D from the ground 28 when the lift system 100 is stowed (i.e., both the platform 130 and the underride 150 are fully raised up away from the ground 28).

Figure 6A:
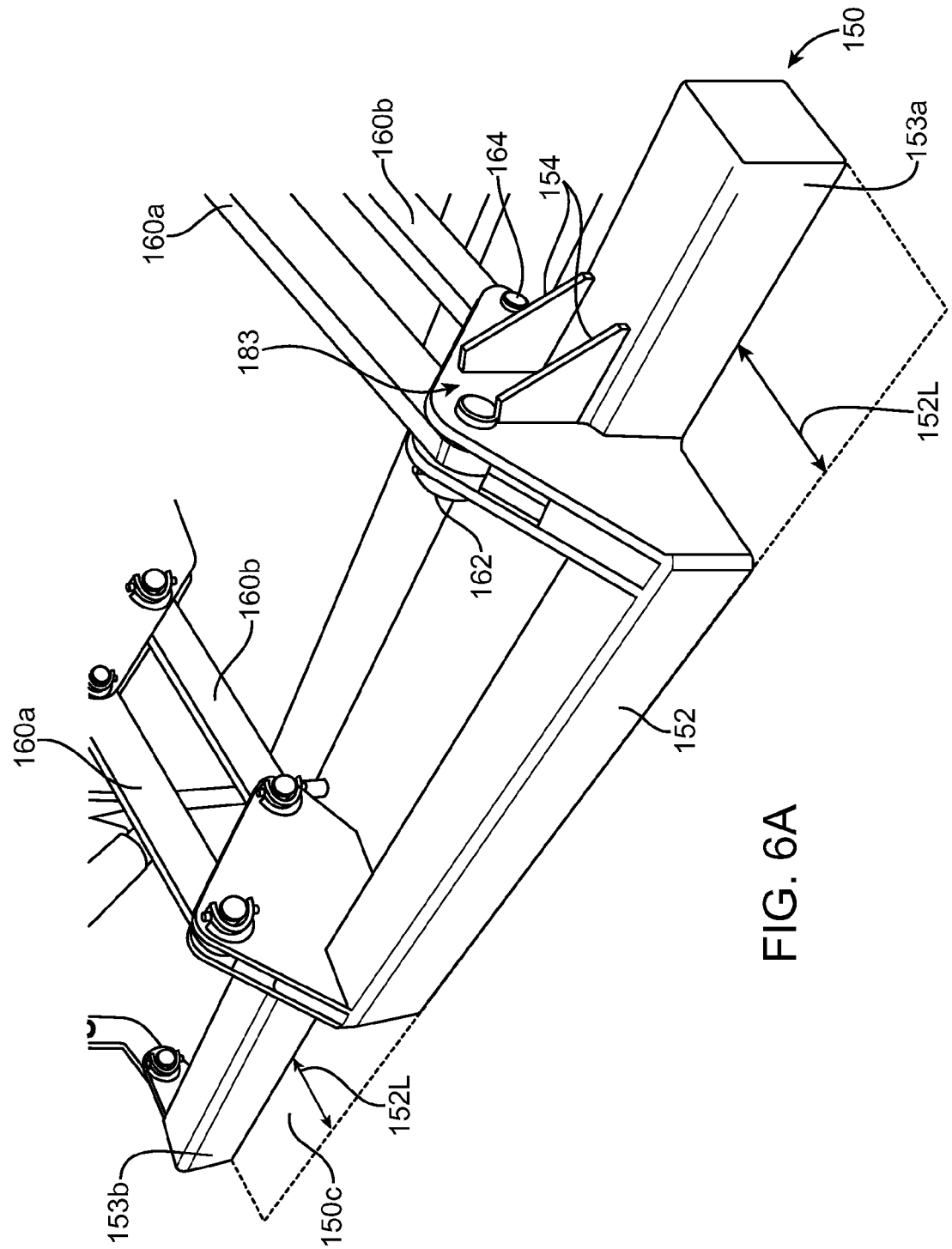
FIG. 6A shows a close-up perspective view of a central extrusion portion of the underride, according to an embodiment of the invention.
Figure 6B:
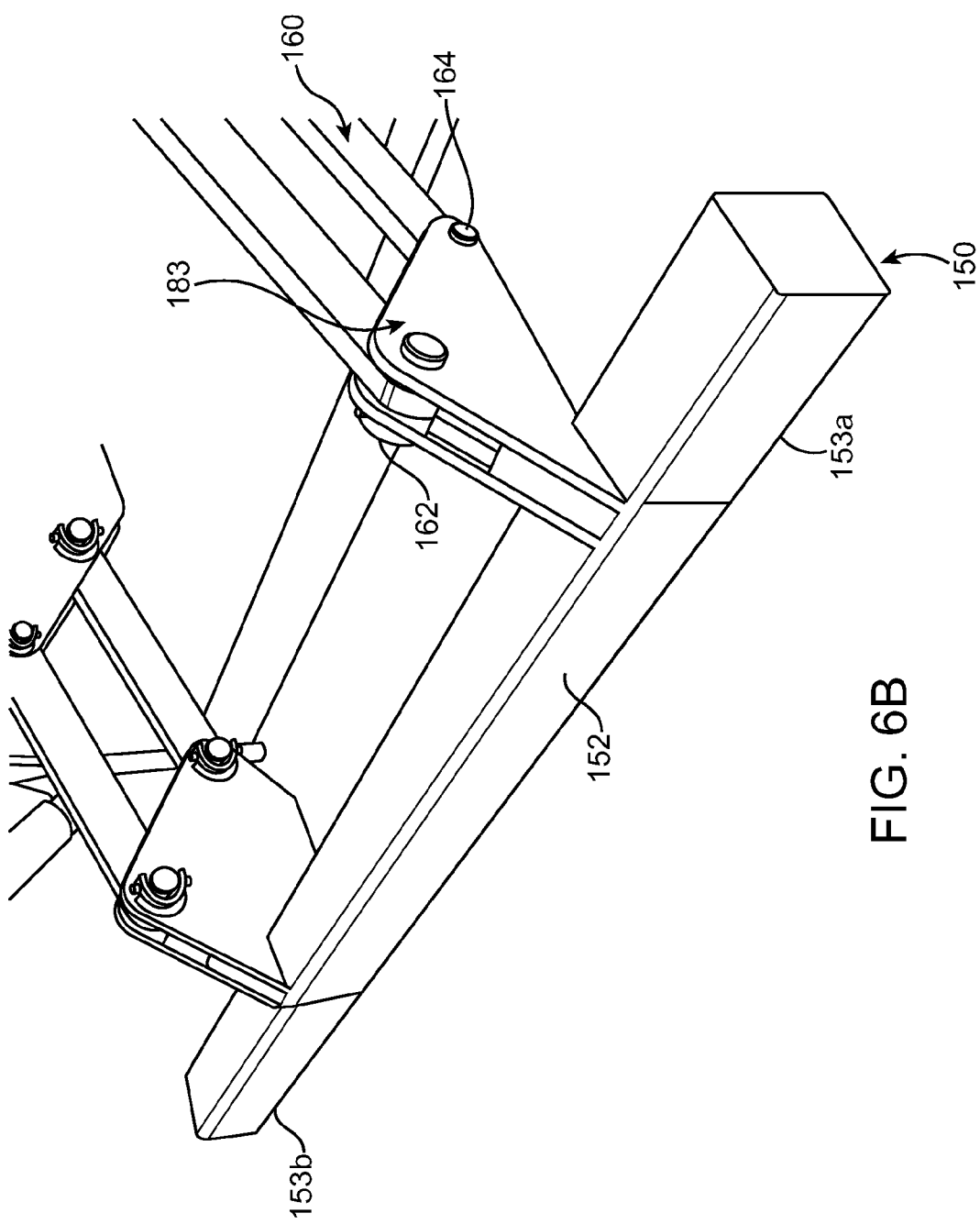
FIG. 6B shows a close-up perspective view of another example underride without an offset middle/central portion, according to an embodiment of the invention.

FIG. 6A is a close-up perspective view of a preferred embodiment of the underride 150 comprising said three portions (elongate segments) 152, 153*a*, 153*b*. Specifically, the central extrusion portion 152 of the underride 150 is connected between a first portion 153*a* and a second portion 153*b* of the underride 150. The extrusion portion 152 is offset by a predetermined distance 152L from the first and second portions 153*a*, 153*b*. In an embodiment, the distance 152L is about 4 inches or larger. In a preferred embodiment, the distance 152L is at least 8 inches. The portions 152, 153*a* and 153*b* define a plane 150*c* of the underride 150. The plane 150*c* as shown is substantially parallel to the ground. The plane 150*c* may also be at a transverse angle in relation to the ground. The extrusion 152 allows the underride 150 to reach farther away from the back of the vehicle for easier access to a dock lock 102 (FIG. 2C), without interfering with the full range of motion of stowing and unstowing the lift platform. The underride 150 also comprises support members 154 (FIG. 6A) to strengthen the joining between the underride 150, adjacent pivot points 162, 164 of the underride linkage 160. FIG. 6B shows a close-up perspective view of another example underride 150 without offsetting the middle/central portion 152, and without interfering with the full range of motion of stowing and unstowing the lift platform, according to an embodiment of the invention. Other examples are possible.

Figure 7:
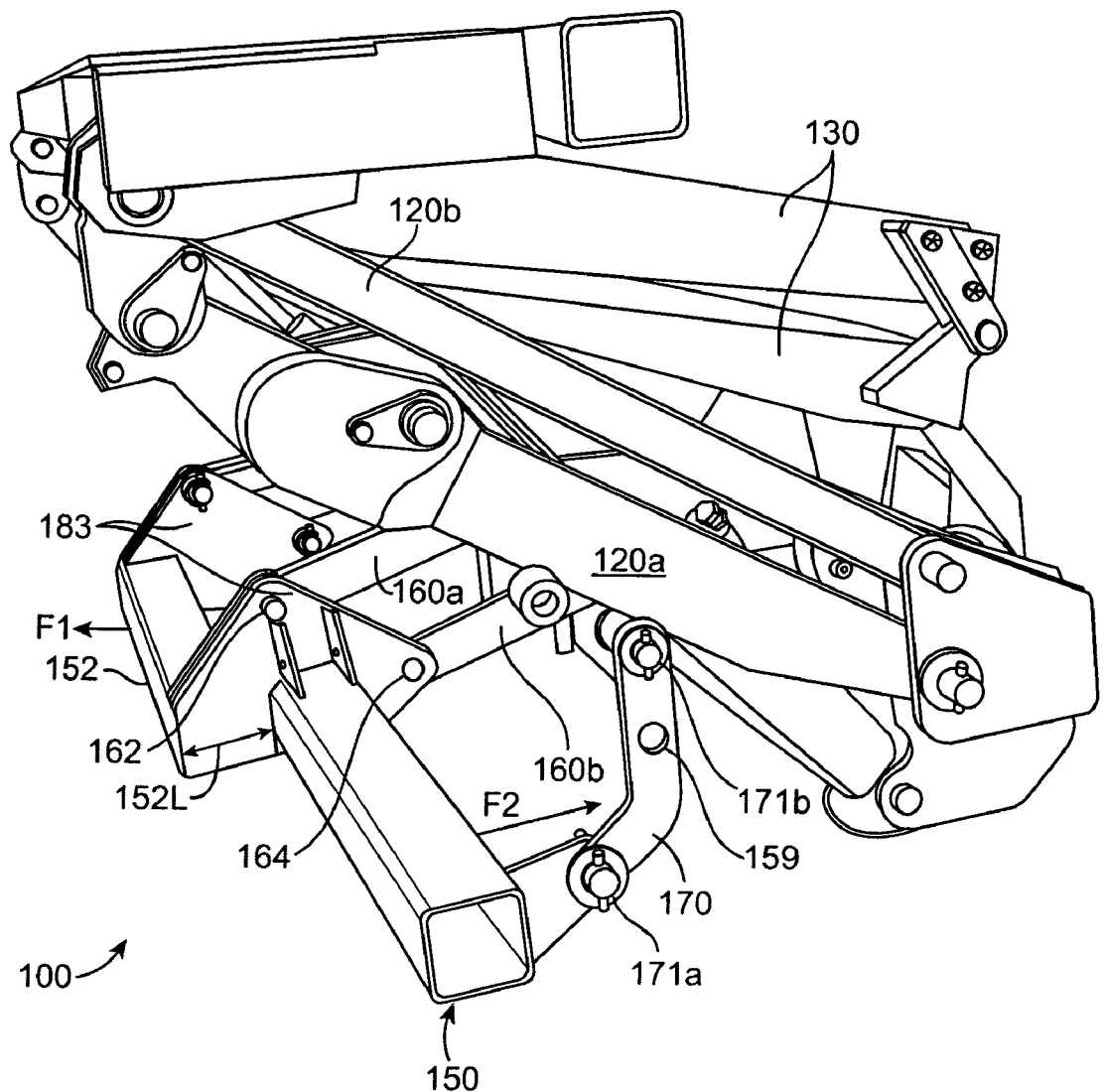
FIG. 7 shows a perspective view of another lift system with the lift in its fully stowed position and the underride raised, according to another embodiment of the invention.

In another embodiment in FIG. 7, the bracket 170 has one or more openings/holes 159, through which one or more pins 171*a*, 171*b* are extended, thus coupling the bracket 170 with the underride 150 and the platform linkage 120. By selecting among the holes 159 at various positions, the position of the underride 150 relative to the vehicle bed 14 can be adjusted.

A dock lock 102 may exert a horizontal force F1 on the extrusion portion 152 of the underride 150. Depending on the configuration of the underride 150 and the underride linkage mechanisms 160, the underride linkage mechanisms 160 may not be extended in the exact direction of the force F1. If so, a lever effect exists at the pivot points 162 and 164 on the underride linkage mechanisms 160. The bracket 170 provides a balancing force F2 on the underride 150 to balance such a lever effect.

Figure 8A:
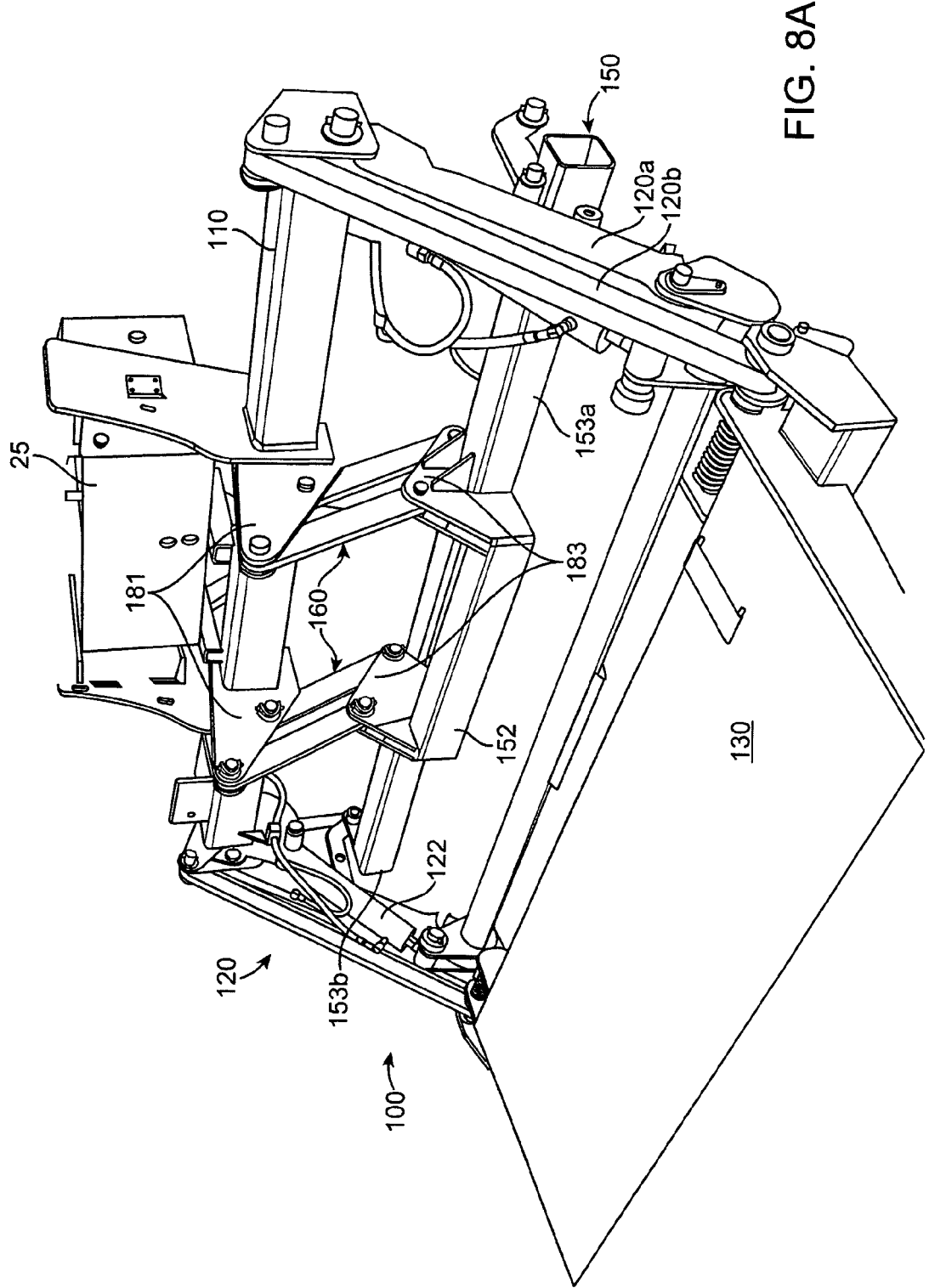
FIG. 8A shows a perspective view of the lift system of FIG. 7 in its unstowed position with the lift platform extended, according to an embodiment of the invention.

FIG. 8A shows a perspective view of the lift system of FIG. 7 in its ground/unstowed position with the lift platform 130 extended. The actuator 122 can drive the platform 130 up and down to load and unload goods, while the platform 130 keeps substantially parallel to the ground level by the platform linkage 120. The underride 150 revolves about the long axis of the frame 110 via the linkage mechanisms 160, while the platform 130 also revolves about the long axis of the frame 110 via the platform linkage mechanisms 120, by the action of the actuator 122 through the platform linkage 120 that couples with the underride 150 and with the actuator 122.

Figure 8B:
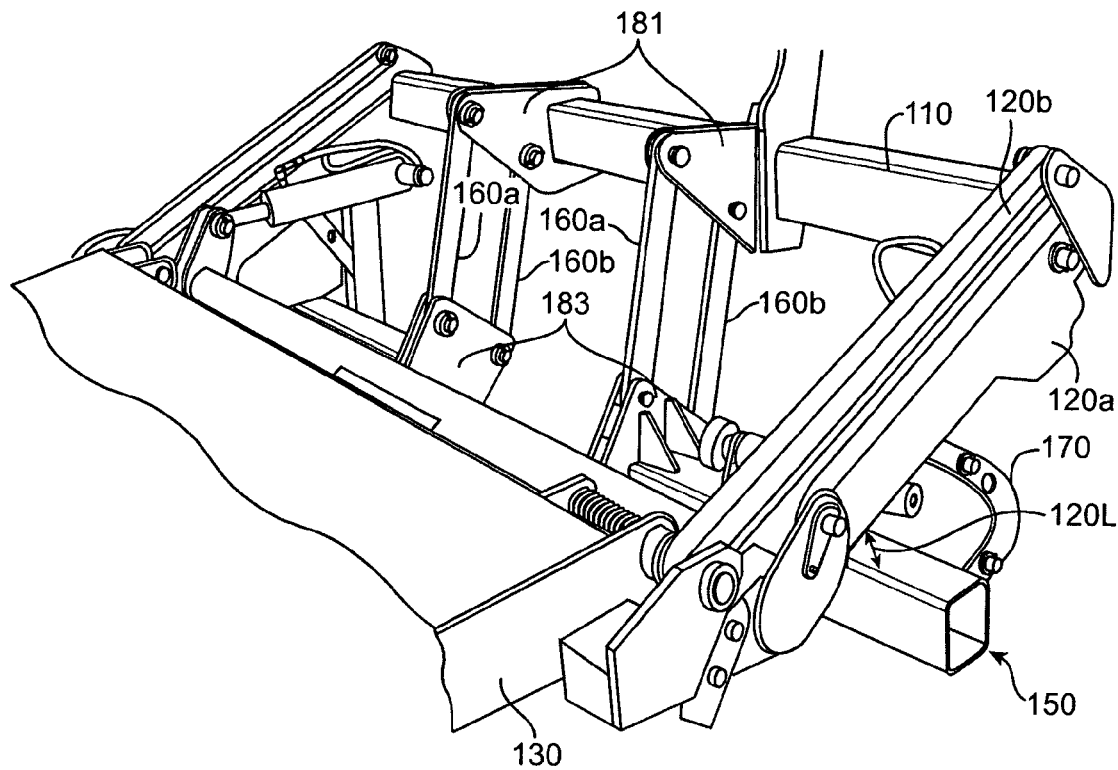
FIG. 8B shows a perspective view of the lift in an intermediate (partially lowered) position with the lift platform extended, according to an embodiment of the invention.

FIG. 8B shows a perspective view of the lift system of FIG. 8A in an intermediate position with the lift platform 130 extended, e.g., when the platform 130 carrying cargo is being raised. As shown, relative to the extrusion portion 152, the first and second portions 153*a*, 153*b* of the underride 150 are effectively offset backward, by a distance 152L (FIG. 6A) away from the extrusion 152, and towards the vehicle, providing a clearance 120L between the platform linkage 120 and the underride 150.

Figure 8C:
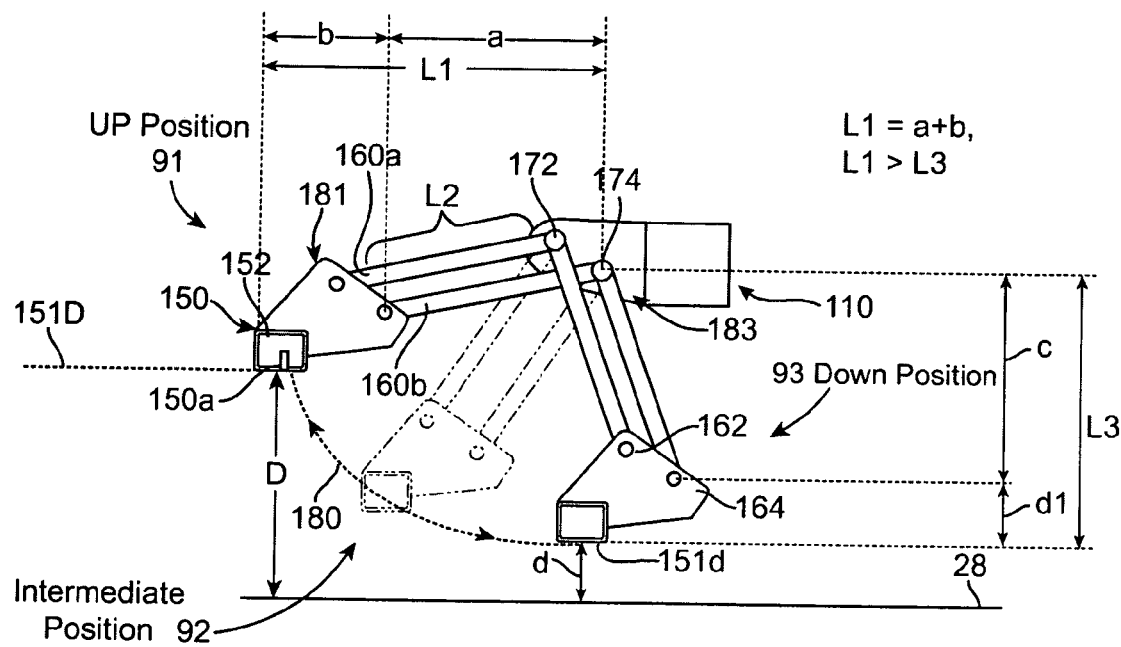
FIG. 8C illustrates side views of the underride moving between different positions, according to an embodiment of the invention.

FIG. 8C illustrates side views of the underride 150 moving from an Up (raised or extended) position 91 to an Intermediate position 92 and then to a Down (lowered or retracted) position 93. The platform 130 is not shown. In the Up position 91, the lower surface 150*a* of the underride 150 defines a plane 151D having a clearance D from the ground level 28, as discussed. In the Down position 93, the lower surface 150a defines a plane 151d having a clearance d from the ground level 28 as discussed.

An underride linkage mechanism 160 in FIG. 8C is shown as a parallelogram having two linkage arms 160a, 160b, which are coupled to the underride 150 at a first set of pivot points 162, 164 on a first parallelogram coupler 181, and are coupled to the frame 110 at a second set of pivot points 172, 174 on a second parallelogram coupler 183. As a result of using the parallelogram linkage mechanism 160, the plane 150c of the underride 150 (FIG. 6A) maintains the same angle (e.g., substantially parallel) relative to the ground level 28 as the underride 150 moves. The underride 150 can have a rectangular cross section with the surface 150a parallel to ground. In addition, as a result of using the extrusion portion 152 together with the first parallelogram coupler 181, the effective arm length L1 of the underride 150 is extended (to lock to the dock lock 102 via the extrusion portion 152) as compared with the arm length L2 of the linkage 160. At the Up (extended) position 91 of the underride 150 (corresponding to the stowed position of the lift), it is desirable to have the maximum length for the convenience of locking the underride 150 on to a dock lock 102 (FIG. 3) without the need for an operator to go deep under the vehicle bed when manual operation of the dock lock 102 is required.

Further as a result of using the second set of pivot points 172, 174, and the first set of pivot points 162, 164, the underride 150 moves around both first and second sets of pivot points, such that the resulting rotation trajectory 180 around the long axis 110x of the frame 110 is non-circular (axis 110x is perpendicular to the plane of the drawing page). The trajectory 180 of the underride lower surface 150a, as seen from the Up position 91, to the Intermediate position 92, and Down position 93, flattens (reaches a minimum plateau) near the ground level 28. Such a flattened trajectory 180 helps control the clearance d and avoids having the underride 150 hit the ground 28 or interfere with fully unstowing the platform 130 to the ground 28.

Due to the action of the underride linkage mechanism 160, in the Up position 91 of the underride 150, the horizontal distance L1 (generally parallel to the ground 28) is equal to the sum of distances a and b (i.e., L1=a+b). The distance L1=a+b, represents said first distance between the underride 150 and the frame 110 when the underride 150 is in the extended (raised or Up) position. A vertical distance L3 (generally perpendicular to the ground 28) represents said second distance between the underride 150 and the frame 110 when the underride 150 is in the retracted (lowered or Down) position. In the Down position 93, the vertical distance L3 as the sum of distances c and d1 (L3=c+d1) is less then the horizontal L1=a+b, wherein L1>L3 (i.e., (a+b)>(c+d1)).

In the Up position 91, the distance a is the horizontal distance between pivot points 174 and 164, and the distance b is the horizontal distance between pivot 164 and the front surface of the extrusion 152 of the underride 150. In the Down position 93, the distance c is the vertical distance between pivot points 174 and 164, and the distance d1 is the vertical distance between pivot point 164 and the bottom surface of the extrusion 152 of the underride 150.

Though a parallelogram linkage mechanism 160 is shown by example, other underride linkage mechanisms between the underride 150 and the frame 110 may be used according to the present invention. The underride linkage mechanism 160 can be of other configurations and have more or fewer linkage arms, such that in the extended position, the underride (at pivot points 162, 164) is at a first distance (L1) from the frame (at pivot points 172, 174), and in the retracted position, the underride (at pivot points 162, 164) is at a second distance (L3) from the frame (at pivot points 172, 174), such that said first distance (for the extended position) is larger than the second distance (for the retracted position).

The action of the underride linkage mechanism provides that when the underride 150 is extended, the horizontal distance (e.g., L1) between the underride 150 and its support frame 110 is larger than the vertical distance (e.g., L3) between the underride 150 and its support frame 110 when the underride is retracted. This has the effect that as the underride 150 moves from its extended position to its retracted position, the effective distance between the underride 150 and the frame 110 is reduced in a way to bring the underride 150 closer to the support 110. The underride linkage mechanism 160 can therefore be selected according to the present invention to provide varying effective distance between the underride 150 and the frame 110, as the underride 150 moves from the extended position 91 to the retracted position 93. The distances L1 and L3 can be varied at least by varying one or more of: (1) the lengths of the linkage arms 160a, 160b, (2) the vertical and/or horizontal distance between the pivot points 162, 164, (3) the vertical and/or horizontal distance between the pivot points 172, 174, (4) shape and dimensions of the coupler 181, (5) placement of the extrusion 152 on the coupler 181, (6) shape and dimensions of the coupler 183, (7) placement of the underride 152 on the coupler 183.

Figure 8E:
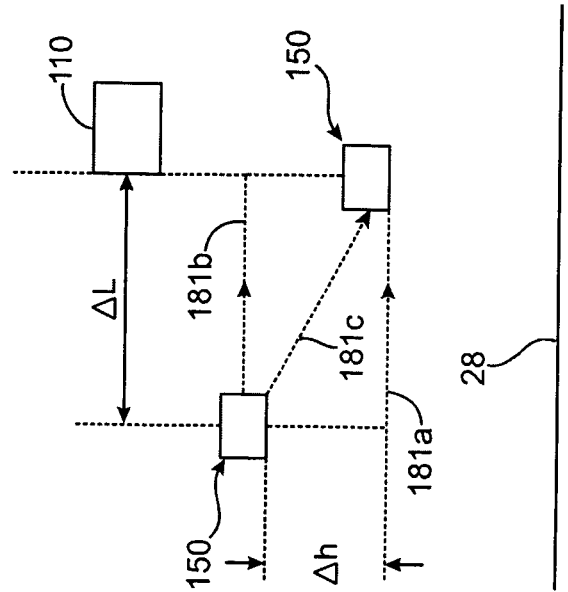
FIG. 8E illustrates a flattened motion trajectory of the underride, according to an alternative embodiment of the invention.
Figure 8F:
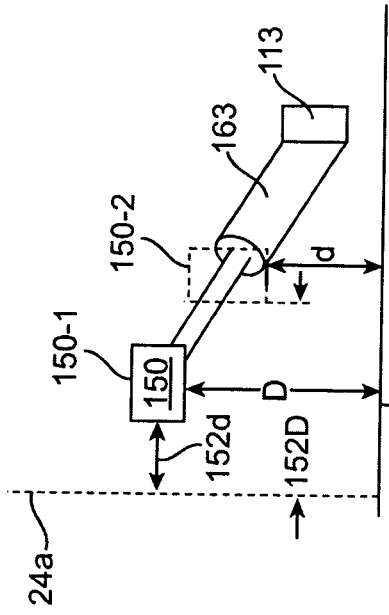
FIG. 8F shows a telescopically moving underride, in accordance with an alternative embodiment of the invention.
Figure 8D:
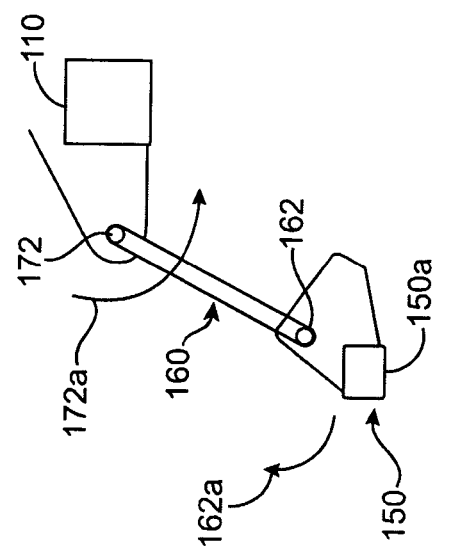
FIG. 8D illustrates rotation of the underride relative to a first and second underride pivot points, according to an embodiment of the invention.

When the underride system is coupled to a vehicle, the underride linkage mechanism geometry can be selected such that in the extended position the underride 150 is proximate the rear end plane of the vehicle, and when the underride 150 is retracted, the distance between the underride 150 and the frame is reduced (relative to the extended position), such that the underride 150 does not contact the ground in a manner that prevents fully retracting the underride 150 or fully unstowing a connected stow lift platform to the ground FIG. 8D illustrates an exemplary underride linkage 160 with a single arm to better illustrate the motion of the underride 150. As shown, the underride 150 rotates relative to the first pivot point 162 in a direction 162a, which as shown is clockwise, and at the same time rotates about the second pivot point 172 in an opposite, counterclockwise direction 172a, when the underride 150 is moving from an Up position to a Down position. This keeps the lower surface 150a of the underride 150 from colliding with the ground 28 while lowering/raising the underride 150, and also results in a flattened, continuous trajectory similar to the trajectory 180 shown in FIG. 8C. As such, the trajectory 180 represents a convoluted motion of the underride 150 about both the first pivot point 162 and the second pivot point 172.

Other mechanisms can be used to achieve a trajectory for the underride 150 to increase the ground clearance d as desired. FIG. 8E illustrates a trajectory 181a of the underride 150 in accordance with an alternative embodiment of the invention. Alternative to the trajectory 181a, trajectory 181b may be used. Yet alternatively, a direct trajectory 181c may be used. This stepped, flattened trajectory 181a may be realized, for example, by using a sliding or telescopic motion as shown in FIG. 8F. Similar to the continuous trajectory 180 shown in FIG. 8C, the height change Ah of the underride during the motion is substantially smaller than the length change ΔL as the underride 150 is lowered towards the ground 28 from an extended position to a retracted position, resulting in the advantages of the flattened trajectory as discussed above with respect to FIG. 8C.

FIG. 8F shows an exemplary telescopically moving underride linkage 163. As shown, the underride linkage 163 (connected between the underride 150 and a support frame 113 or frame 110) telescopically moves the underride 150 from its extended position 150-1 to a retracted position 150-2, whereby the distance between the underride 150 and the frame 110 is reduced as the underride 150 moves from the extended position 150-1 to the retracted position 150-2. The underride linkage 163 may also be coupled between the underride 150 and the frame 110 in a fashion where the telescopic action of the linkage 163 causes the underride 150 to travel in an essentially horizontal trajectory between its extended position and the retracted position. The lift platform 130 revolves around the frame 110 from stowed to unstowed position, and at about the same time the telescopic linkage 163 moves the underride 150 from an extended position (proximate plane 24*a*) to a retracted position (away from plane 24*a*) in a horizontal direction (e.g., 181*b* in FIG. 8E) essentially parallel to ground 28, without lowering the underride 150 toward the ground 28. In this example, the underride 150 and the platform 130 may be moved by different (optionally synchronized) actuators.

When the underride system is coupled to a vehicle, the horizontal distance from the underride 150 to the rear end plane 24*a* correspondingly increases from 152*d* to 152D while the vertical distance decreases from D to d. Other mechanisms can be used for the linkage 163, and the retracting and extension motion can be combined with other motions such as a rotating motion.

Figure 9:
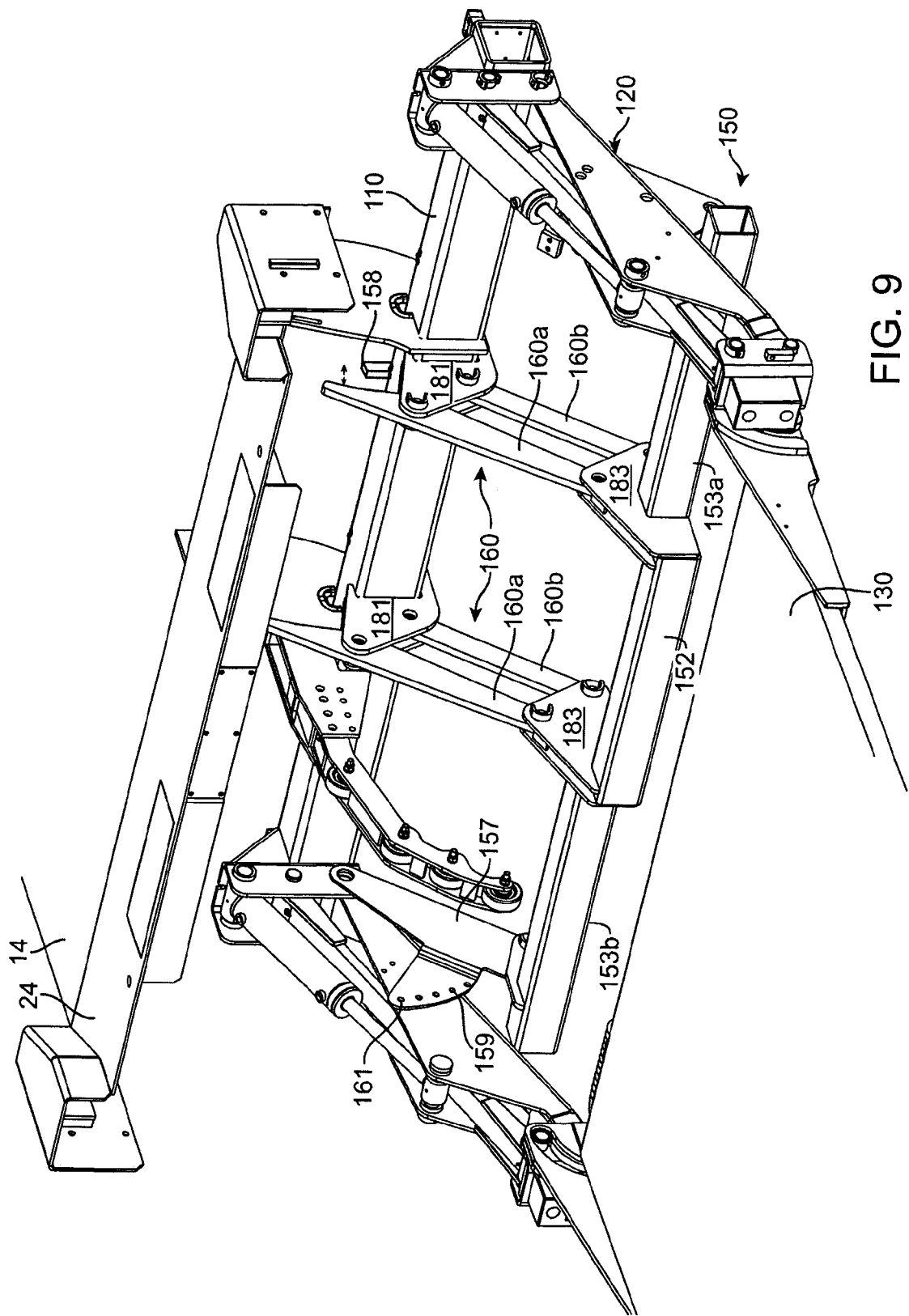
FIG. 9 is a close-up perspective view of the underride with the lift fully unstowed, according to an embodiment of the invention.

FIG. 9 provides a perspective view of components of a lowered underride 150 according to another embodiment of the invention. A support arm 158 is provided on the frame 110 to provide a vertical support for the upper end of the underride linkage 160*a* when the underride 150 is raised and locked to a dock lock 102 that provides an upward support.

A coupler 157 is also used to couple the frame 110 with the underride 150. The coupler 157 has a plurality of holes 159 to receive a pin 161. By selecting which hole to use, the distance of the underride 150 may be adjusted relative to the vehicle bed and ground. Thus, the coupler 157 provides a functionality similar to the adjusting bracket 170 shown in FIG. 3A.

To summarize preferred embodiments of the invention, a lift suitable for use with a vehicle is described. The lift includes an underride which can be used with a dock lock, yet the underride does not interfere with the platform of the lift when the platform is stowed or unstowed. In one embodiment, the underride is coupled to the vehicle with a parallelogram linkage and to the platform linkage, which raises and lowers the underride when the platform is raised and lowered.

Figure 1B:
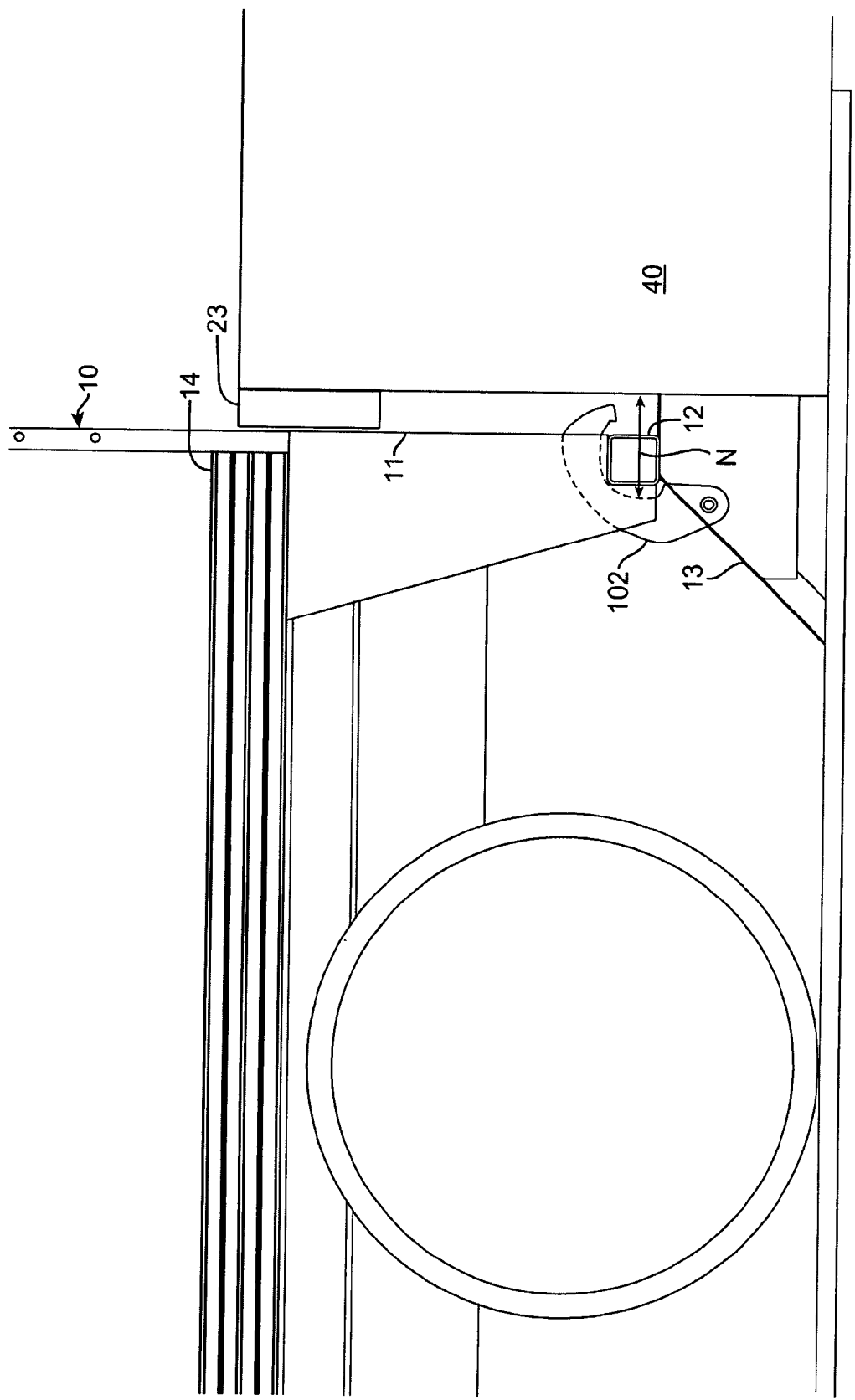
FIG. 1B shows a side view of the vehicle of FIG. 1A, locked to a dock via a dock lock.
Figure 1C:
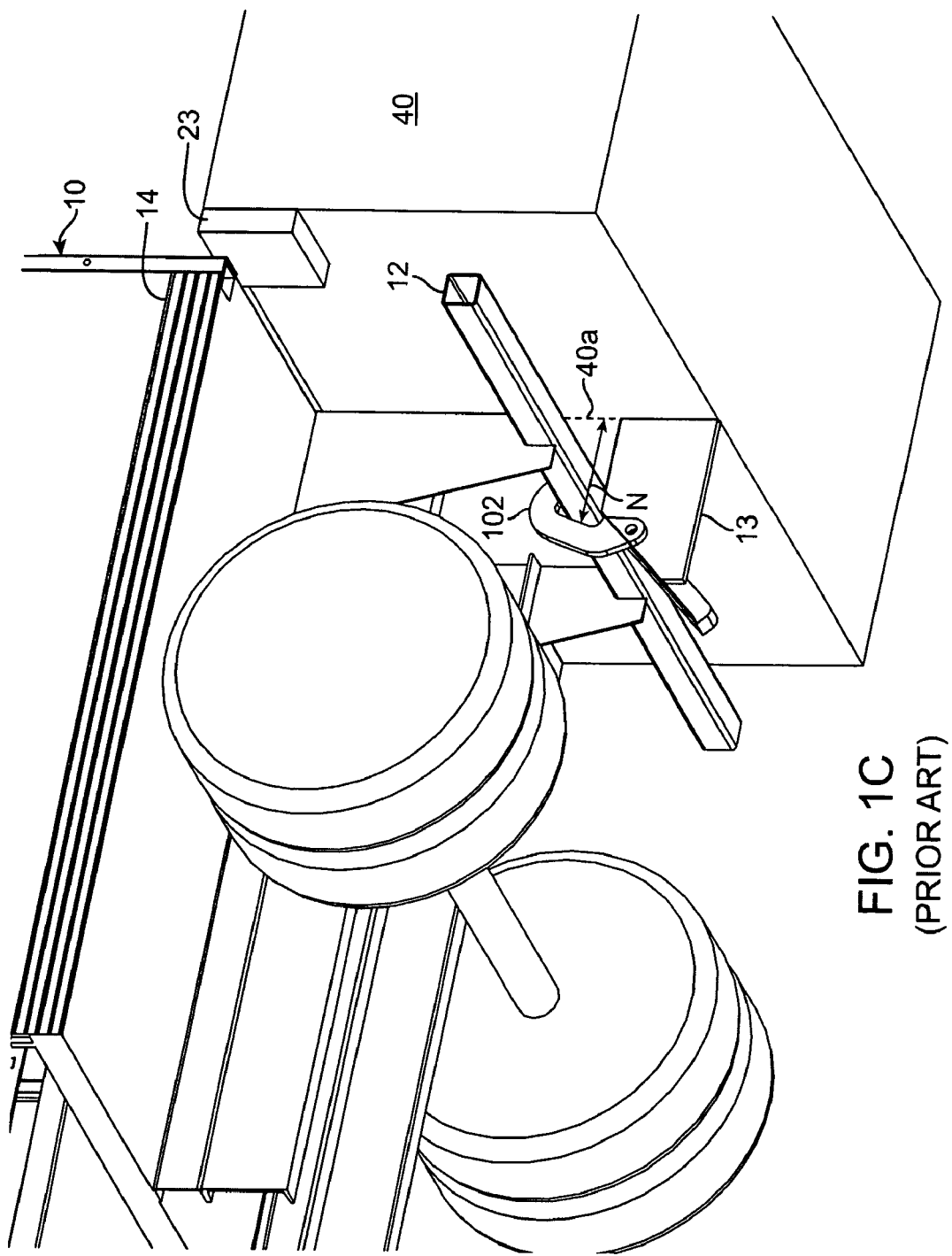
FIG. 1C shows a perspective underside view of the vehicle of FIG. 1B, locked to a dock via a dock lock.

FIGS. 3A-4B show one embodiment of a lift 100 in accordance with the present invention in a stowed position. FIG. 3A shows an isometric view of the lift 100. FIG. 1B shows a side view of the lift 100.

The lift 100 includes a frame 110 coupled by a platform linkage 120 to a platform 130. The frame 110 allows the lift 100 to be installed to the vehicle. The platform linkage 120 is coupled to an actuator 122 and is capable of raising and lowering the platform 130. The platform 130 is foldable and rotatably coupled to the platform linkage 120 for stowing. The lift 100 also may include an extension plate 24 which is coupled substantially level with a vehicle bed 14.

The lift 100 also includes an underride 150. The underride 150 is capable of being used with dock locks to prevent the vehicle from being pushed away or "seesawing" while the vehicle is parked at a dock or other loading facility.

The underride 150 may be coupled by an underride linkage 160 to a frame 110. Underride linkage 160 is capable of raising and lowering the underride 150, so that the underride 150 does not interfere with the platform 130 when the platform 130 is being stowed or unstowed. The underride linkage 160 may be a parallelogram linkage or any other suitable linkage. The underride linkage 160 is configured so that the underride 150 does not contact the ground when the underride 150 is lowered.

The underride 150 and/or the underride linkage 160 may be coupled to the platform linkage 120, so that when the platform linkage 120 raises or lowers the platform 130, the platform linkage 120 also raises or lowers the underride 150. The underride 150 and/or underride linkage 160 may be coupled to the platform linkage 120 with a bracket 170. Bracket 170 may be fixed or adjustable so that the height of the underride 150 can be changed to accommodate different vehicle bed heights.

In an alternative embodiment, the underride 150 and/or underride linkage 160 may be moved by an underride actuator. The underride 150 may then be raised and lowered independently of the platform 130. Alternatively, the underride 150 may be slidably coupled underneath the vehicle bed, and the underride 150 may be extended and retracted by an actuator or other device.

Consequently, the underride 150 can be configured so that it extends far enough towards the rear of the vehicle so that it can be used with a dock lock, yet the underride 150 can be moved out of the way when the platform 130 is being stowed or unstowed. In other words, the underride 150 can be configured so that it is positioned closer to the rear edge of the vehicle bed, allowing the underride 150 to be used with a dock lock. FIGS. 4A-4B show the lift 100 in a ground position. FIG. 4A shows an isometric view of the lift 100. FIG. 4B shows a side view of the lift 100.

The underride 150 and/or underride linkage 160 is coupled to the platform linkage 120, and thus, the underride 150 moves with the platform linkage 120 and the platform 130. Underride 150 lowers with the platform 130, and the underride 150 moves out of the way so that it does not contact the platform 130 as it is stowed or unstowed. In the fully lowered position, platform 130 is brought near to or on the ground, and the lift 100 can load and unload cargo from the ground. The underride 150 is also fully lowered, but the underride 150 does not contact the ground. FIGS. 5A-5B show side views of the lift 100 in stowed and ground positions, respectively. As mentioned above, the bracket 170 may be fixed or adjustable so that the height of the underride 150 can be changed to accommodate different vehicle bed heights. As shown in FIG. 5A, the bracket 170 has been coupled to the platform linkage 120 so that, even though vehicle bed 14 is higher, the underride 150 is at about the same height from the ground as the underride in FIG. 4B. As can be seen in FIG. 5B, the underride 150 does not contact the ground when the lift 100 is in ground position.

While the invention has been described in terms of some specific examples and in some specific embodiments, it will be clear that this invention is not limited to these specific examples and embodiments and that many changes and modified embodiments will be obvious to those skilled in the art without departing from the true spirit and scope of the invention as defined in the appended claims.

What is claimed is:

1. A lift system configured for use with a vehicle, the lift system comprising:
   a stow lift; and
   an underride system;
   the stow lift including a lift platform coupled to a lift support frame via a lift linkage comprising a first parallel linkage, the lift platform capable of being moved by an actuator via the lift linkage between a stowed position and an unstowed position; and the underride system including a generally elongate underride member and an underride linkage mechanism comprising a second parallel linkage, for coupling the underride member to a fixed support frame for moving the underride member between an extended position and a retracted position;

wherein, in the extended position the underride member is at a first distance from the fixed support frame, and in the retracted position the underride is at a second distance from the fixed support frame, such that the first distance is larger than the second distance;

such that the extended position of the underride member corresponds to the stowed position of the lift platform, and the retracted position of the underride member corresponds to the unstowed position of the lift platform, whereby in the retracted position, the underride member allows the lift platform to be moved to the unstowed position.

2. The lift system of claim 1, wherein:

when the underride system is mounted on a vehicle the linkage mechanism revolves the underride member about the fixed support frame from the extended position to the retracted position, avoiding interference with the ground while moving toward the retracted position, in the retracted position the underride member being closer to ground than in the extended position; and in the extended position, the underride member is disposed relative to the fixed support frame such that at least a portion of the underride member can be engaged by a dock lock at a docking station.

3. The lift system of claim 2, wherein when the lift system is mounted on a vehicle, the underride member moves inwardly towards the vehicle while moving from the extended position to the retracted position, and in the extended position at least a portion of the underride member can be engaged by a dock lock at a docking station when the vehicle is essentially adjacent the docking station.

4. The lift system of claim 2, wherein in the retracted position of the underride system, the linkage mechanism maintains the underride member essentially on or above the ground.

5. The lift system of claim 2, wherein when the actuator moves the lift platform from the stowed position to the unstowed position, the linkage mechanism moves the underride member from the extended position to the retracted position to allow the lift platform to be moved from the stowed position to the unstowed position without blocking interference from the underride member.

6. The lift system of claim 5, wherein the lift platform is rotatably coupled to the fixed support frame such that the actuator revolves the lift platform about the fixed support frame between the stowed position and the unstowed position, and the linkage mechanism revolves the underride member about the fixed support frame from the extended position to the retracted position, such that the underride member moves in a flattened trajectory from the extended position to the retracted position, such that the flattened trajectory allows the underride member to avoid interference with the lift platform and/or the ground in the extended position.

7. The lift system of claim 1, further comprising adjusting mechanisms for adjusting a position of the underride system relative to the vehicle, wherein the lift support frame and said fixed support frame are the same fixed support frame which remains immobile relative to the vehicle as the underride member and the lift platform move about said same fixed support frame.

8. The lift system of claim 2, wherein the underride linkage mechanism comprises a parallelogram linkage, independent of the lift linkage mechanism.

9. The lift system of claim 2, wherein the underride member comprises an elongate member having a first portion and a second portion and an extrusion portion therebetween for engaging a dock lock, wherein the extrusion portion is axially offset relative to the first and second portions.

10. The lift system of claim 9, wherein the extrusion portion has a length such that the underride member does not interfere with motion of the lift platform.

* * * * *